US012632437B2

(12) United States Patent
Zhang et al.

(10) Patent No.: US 12,632,437 B2
(45) Date of Patent: May 19, 2026

(54) WORKLOAD-DRIVEN DATABASE REORGANIZATION

(71) Applicant: International Business Machines Corporation, Armonk, NY (US)

(72) Inventors: Hong Mei Zhang, Beijing (CN); Shuo Li, Beijing (CN); Xiaobo Wang, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 17/030,388

(22) Filed: Sep. 24, 2020

(65) Prior Publication Data

US 2022/0092049 A1     Mar. 24, 2022

(51) Int. Cl.
*G06F 16/22* (2019.01)
*G06F 16/28* (2019.01)

(52) U.S. Cl.
CPC ........ *G06F 16/2282* (2019.01); *G06F 16/285* (2019.01)

(58) Field of Classification Search
CPC .... G06F 16/2282; G06F 16/285; G06F 16/28; G06F 16/22; G06F 11/3409
See application file for complete search history.

(56) References Cited

U.S. PATENT DOCUMENTS 7,657,584 B2   2/2010  Kawamura et al.
7,797,347 B2   9/2010  Draese
(Continued)

FOREIGN PATENT DOCUMENTS

DE       102021123844 A1     3/2022
GB          2600241 A        4/2022
(Continued)

OTHER PUBLICATIONS

Oracle (Non Patent Literature—Oracle® Database—Database New Features Guide, 12c Release 2 (12.2), E85871-02, Dec. 2017) (Year: 2017).*

(Continued)

*Primary Examiner* — Apu M Mofiz
*Assistant Examiner* — Oscar Wehovz
(74) *Attorney, Agent, or Firm* — Shackelford, McKinley & Norton, LLP

(57)                    ABSTRACT

A system, computer program product, and method are provided for driving database reorganizations subject to determined workloads, and, more specifically, to providing an online partial reorganization of a database to improve workload performance. The method includes collecting performance information for one or more performance sensitive workloads associated with one or more portions of a database and analyzing the collected performance information. For each of the one or more performance sensitive workloads, indications of performance declines thereof are determined. Subject to the determined performance declines, at least one of the one or more database portions affected by the determined performance declines are determined. Subject to the database portions determination, the determined performance declines are classified. Subject to the classification of the performance declines, one or more partial reorganizations of the one or more database portions is executed.

17 Claims, 13 Drawing Sheets

(56) References Cited

U.S. PATENT DOCUMENTS

| | | | | |
|---|---|---|---|---|
| 9,009,112 | B2 | 4/2015 | Denuit et al. | |
| 11,455,309 | B2 | 9/2022 | Zhang et al. | |
| 2001/0047360 | A1 | 11/2001 | Huras | |
| 2004/0243555 | A1 | 12/2004 | Bolsius et al. | |
| 2006/0036618 | A1 | 2/2006 | Shuma et al. | |
| 2006/0206543 | A1* | 9/2006 | Nishino | G06F 16/2228 |
| | | | | 707/999.203 |
| 2007/0016582 | A1* | 1/2007 | Kawamura | G06F 16/22 |
| 2008/0235183 | A1* | 9/2008 | Draese | G06F 16/22 |
| 2011/0225122 | A1 | 9/2011 | Denuit | |
| 2015/0186490 | A1* | 7/2015 | Denuit | G06F 16/278 |
| | | | | 707/634 |
| 2020/0356543 | A1* | 11/2020 | Yan | G06F 16/278 |
| 2021/0081453 | A1* | 3/2021 | Eadon | G06F 16/278 |
| 2022/0019565 | A1* | 1/2022 | Nagayanallur Subramanian | |
| | | | | G06F 11/0772 |
| 2022/0075768 | A1* | 3/2022 | Geiselhart | G06F 16/275 |

FOREIGN PATENT DOCUMENTS

| | | |
|---|---|---|
| JP | H11-102311 A | 4/1999 |
| JP | 2007-026062 A | 2/2007 |
| JP | 2022-053542 A | 4/2022 |

OTHER PUBLICATIONS

Determining when to reorganize tables and indexes, IBM, accessed Jun. 15, 2020, 5 pages. <https://www.ibm.com/support/knowledgecenter/ SSEPGG_11.5.0/ com.ibm.db2.luw.admin.perf.doc/doc/t0005079. html>.

Jamen, "Oracle Enterprise Manager Database Tuning with the Oracle Tuning Pack," Oracle Corporation, Jun. 2001, 282 pages. <https://docs.oracle.com/cd/B10501_01/em.920/a86647.pdf>.

Mell et al., "The NIST Definition of Cloud Computing", Recommendations of the National Institute of Standards and Technology, Special Publication 800-145, Sep. 2011, 7 pages.

Sockut et al., "Online Reorganization of Databases," ACM Computing Surveys, vol. 41, No. 3, Article 14, Jul. 2009, 136 pages. <https://dl.acm.org/doi/10.1145/1541880.1541881>.

Zhang et al., "Partition Key Adjustment Based on Query Workload," U.S. Appl. No. 16/926,831, filed Jul. 13, 2020.

Combined Search and Examination Report under Sections 17 and 18(3). Mailed Feb. 18, 2022. Application No. GB2113145.3.

Japan Patent Office, "Notice of Reasons For Refusal" Mar. 18, 2025, 08 Pages, JP Application No. 2021-156008.

Office Action for German Patent Application No. 10 2021 123 844.7 dated Jun. 11, 2024, pp. 1-4.

* cited by examiner

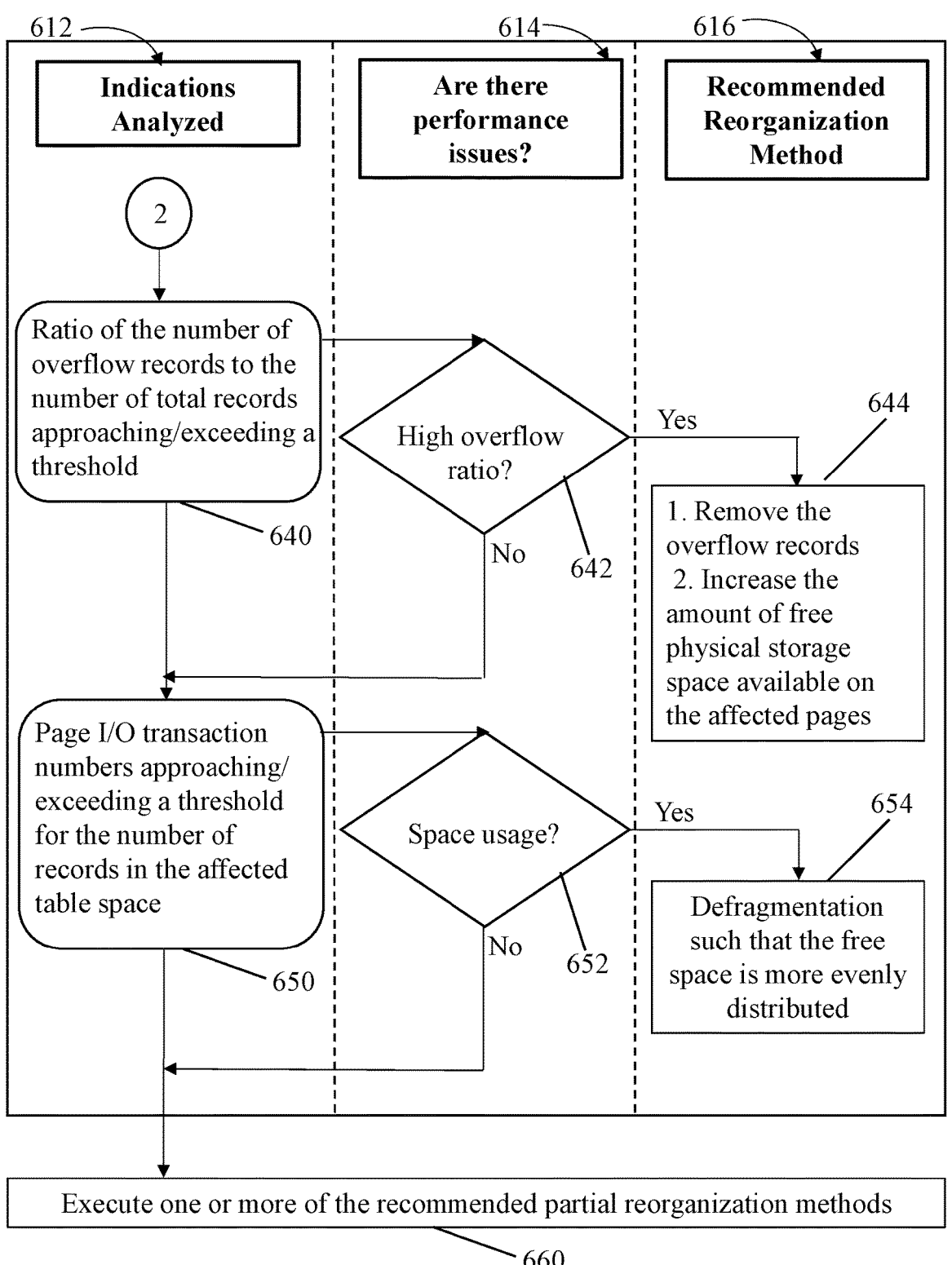

612 —

Indications Analyzed

614 —

Are there performance issues?

616 —

Recommended Reorganization Method

2

Ratio of the number of overflow records to the number of total records approaching/exceeding a threshold

640

High overflow ratio?

No     642

Yes

644

1. Remove the overflow records
2. Increase the amount of free physical storage space available on the affected pages Page I/O transaction numbers approaching/exceeding a threshold for the number of records in the affected table space

650

Space usage?

No     652

Yes

654

Defragmentation such that the free space is more evenly distributed

Execute one or more of the recommended partial reorganization methods

Unload    1020

1024

1032

1040

1036

ReLoad    1030

Buffer pool    1034

1044

1038

1060

Build keys

1070

Online trans sync    1042

Switch

Old ROWID    1066

1064

New ROWID    1068

1060

Key    New ROWID 1062    1068

WORKLOAD-DRIVEN DATABASE REORGANIZATION

BACKGROUND

The present disclosure relates to driving database reorganizations subject to determined workloads, and, more specifically, to providing an online partial reorganization of a database to improve workload performance.

Many known database storage systems require periodic reorganizations of the stored data therein based on collected performance data of the database storage and the associated indices. The collected performance data is typically at the table space or partition level, and the collected performance data is analyzed by one or more tools to determine a need to reorganize the stored data.

SUMMARY

A system, computer program product, and method are provided for determining a need to execute a partial workload performance-driven data reorganization.

In one aspect, a computer system is provided for determining a need to execute a partial workload performance-driven data reorganization. The system includes one or more processing devices and at least one memory device operably coupled to the one or more processing devices. The one or more processing devices are configured to collect performance information for one or more performance sensitive workloads associated with one or more portions of a database, and analyze the collected performance information. The analyses determine for each of the one or more performance sensitive workloads, indications of performance declines thereof, and determine, subject to the determined performance declines, at least one of the one or more database portions affected by the determined performance declines. The analyses also classify, subject to the database portions determination, the determined performance declines, and execute, subject to the classification of the performance declines, one or more partial reorganizations of the one or more database portions.

In another aspect, a computer program product is provided for determining a need to execute a partial workload performance-driven data reorganization. The computer program product includes one or more computer readable storage media, and program instructions collectively stored on the one or more computer storage media. The product also includes program instructions to collect performance information for one or more performance sensitive workloads associated with one or more portions of a database. The product further includes program instructions to analyze the collected performance information. The product also includes program instructions to determine for each of the one or more performance sensitive workloads, indications of performance declines thereof, and determine, subject to the determined performance declines, at least one of the one or more database portions affected by the determined performance declines. The product also includes program instructions to classify, subject to the database portions determination, the determined performance declines, and execute, subject to the classification of the performance declines, one or more partial reorganizations of the one or more database portions.

In yet another aspect, a computer-implemented method is provided for determining a need to execute a partial workload performance-driven data reorganization. The method includes collecting performance information for one or more performance sensitive workloads associated with one or more portions of a database. The method also includes analyzing the collected performance information including one or more of: determining for each of the one or more performance sensitive workloads, indications of performance declines thereof; determining, subject to the determined performance declines, at least one of the one or more database portions affected by the determined performance declines; and classifying, subject to the database portions determination, the determined performance declines. The method further includes executing, subject to the classification of the performance declines, one or more partial reorganizations of the one or more database portions.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 6C is a continuation of the flowchart from FIG. 6B, in accordance with some embodiments of the present disclosure.

Figure 1:
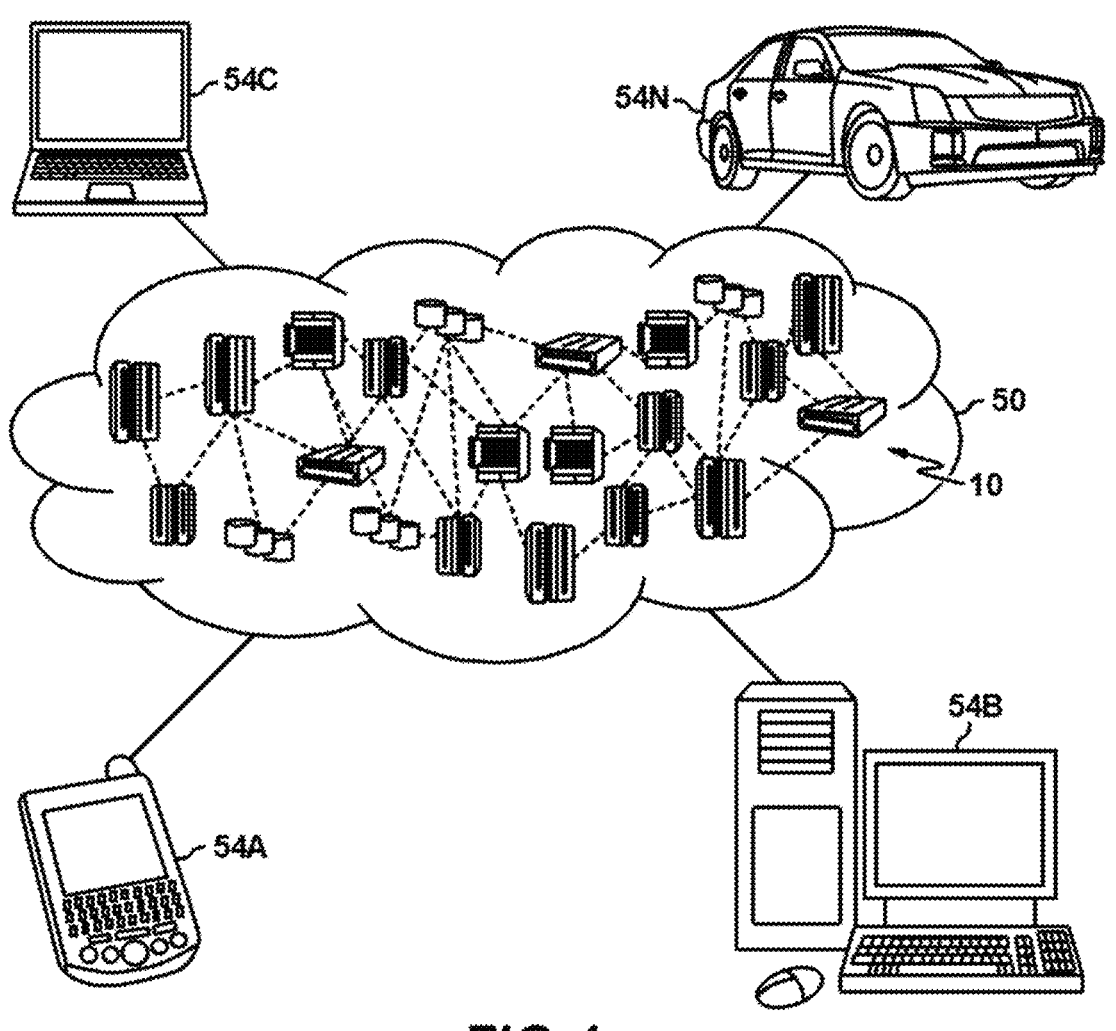
FIG. 1 is a schematic diagram illustrating a cloud computing environment, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
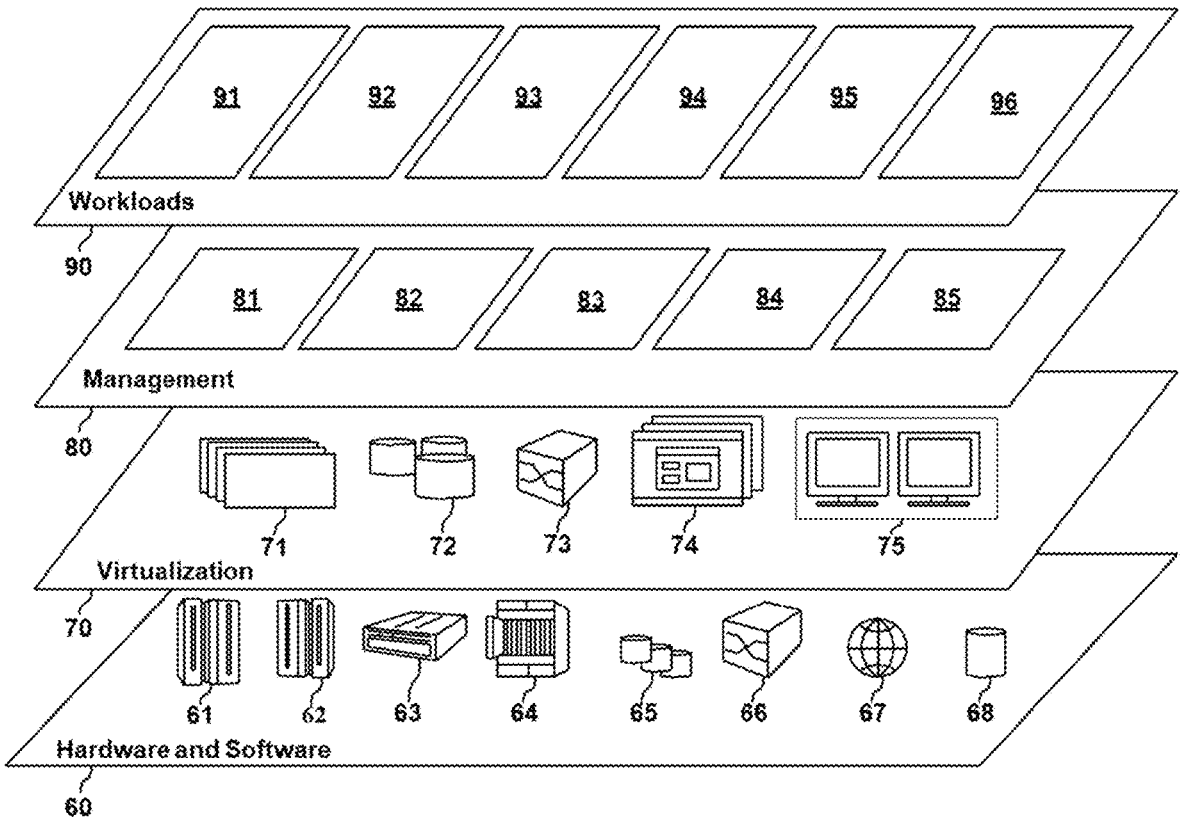
FIG. 2 is a block diagram illustrating a set of functional abstraction model layers provided by the cloud computing environment, in accordance with some embodiments of the present disclosure.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining a need to execute a partial workload performance-driven data reorganization 96.

Figure 3:
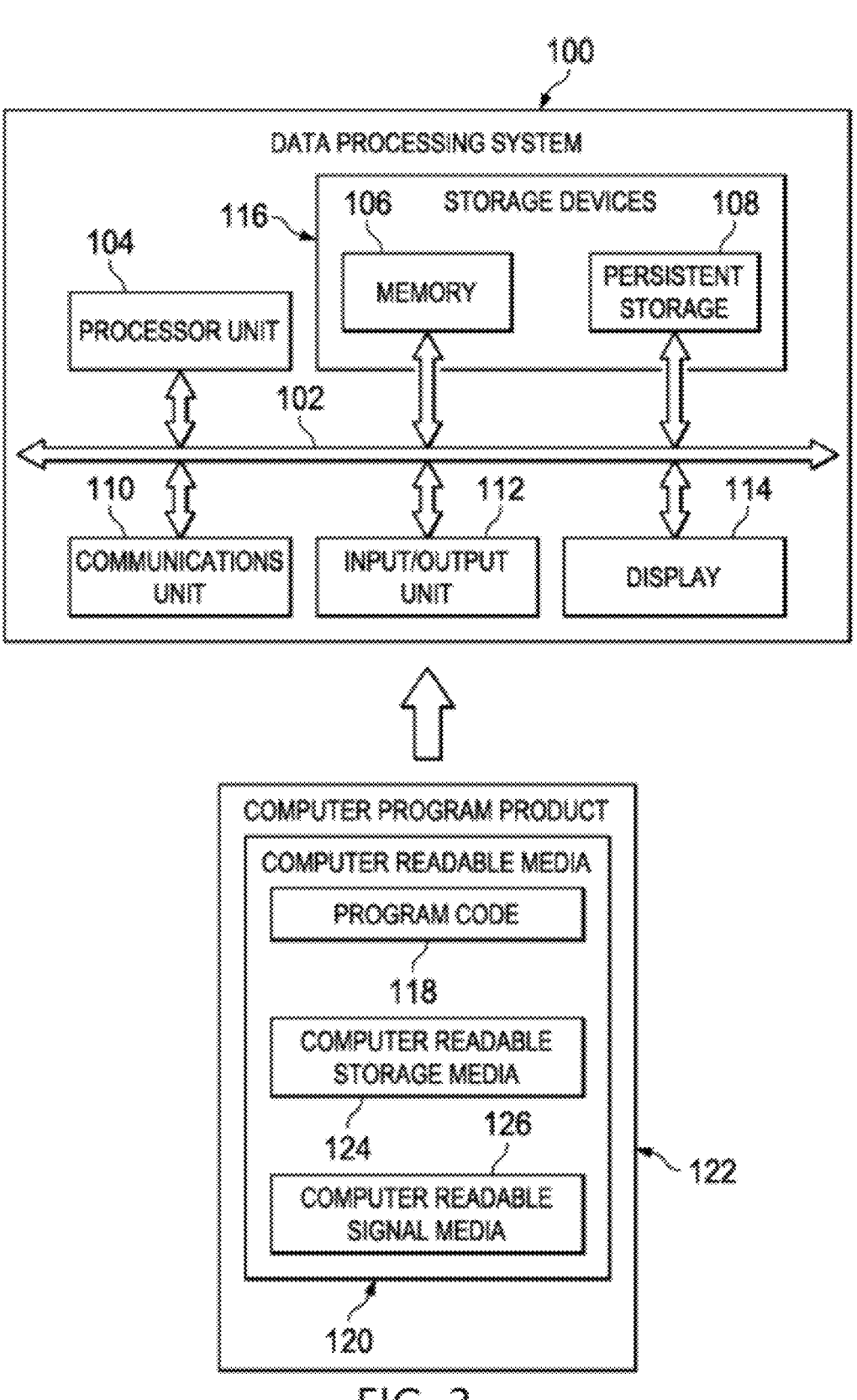
FIG. 3 is a block diagram illustrating a computer system/server that may be used as a cloud-based support system, to implement the processes described herein, in accordance with some embodiments of the present disclosure.

Referring to FIG. 3, a block diagram of an example data processing system, herein referred to as computer system 100 is provided. System 100 may be embodied in a computer system/server in a single location, or in at least one embodiment, may be configured in a cloud-based system sharing computing resources. For example, and without limitation, the computer system 100 may be used as a cloud computing node 10.

Aspects of the computer system 100 may be embodied in a computer system/server in a single location, or in at least one embodiment, may be configured in a cloud-based system sharing computing resources as a cloud-based support system, to implement the system, tools, and processes described herein. The computer system 100 is operational with numerous other general purpose or special purpose computer system environments or configurations. Examples of well-known computer systems, environments, and/or configurations that may be suitable for use with the computer system 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

The computer system 100 may be described in the general context of computer system-executable instructions, such as program modules, being executed by the computer system 100. Generally, program modules may include routines, programs, objects, components, logic, data structures, and so on that perform particular tasks or implement particular abstract data types. The computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, the computer system 100 is shown in the form of a general-purpose computing device. The components of the computer system 100 may include, but are not limited to, one or more processors or processing devices 104

(sometimes referred to as processors and processing units), e.g., hardware processors, a system memory 106, and a communications bus 102 that couples various system components including the system memory 106 to the processing device 104. The communications bus 102 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 100 typically includes a variety of computer system readable media. Such media may be any available media that is accessible by the computer system 100 and it includes both volatile and non-volatile media, removable and non-removable media. In addition, the computer system 100 may include one or more persistent storage devices 108, communications units 110, input/output (I/O) units 112, and displays 114.

The processing device 104 serves to execute instructions for software that may be loaded into the system memory 106. The processing device 104 may be a number of processors, a multi-core processor, or some other type of processor, depending on the particular implementation. A number, as used herein with reference to an item, means one or more items. Further, the processing device 104 may be implemented using a number of heterogeneous processor systems in which a main processor is present with secondary processors on a single chip. As another illustrative example, the processing device 104 may be a symmetric multiprocessor system containing multiple processors of the same type.

The system memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The system memory 106, in these examples, may be, for example, a random access memory or any other suitable volatile or non-volatile storage device. The system memory 106 can include computer system readable media in the form of volatile memory, such as random access memory (RAM) and/or cache memory.

The persistent storage 108 may take various forms depending on the particular implementation. For example, the persistent storage 108 may contain one or more components or devices. For example, and without limitation, the persistent storage 108 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the communication bus 102 by one or more data media interfaces.

The communications unit 110 in these examples may provide for communications with other computer systems or devices. In these examples, the communications unit 110 is a network interface card. The communications unit 110 may provide communications through the use of either or both physical and wireless communications links.

The input/output unit 112 may allow for input and output of data with other devices that may be connected to the computer system 100. For example, the input/output unit 112 may provide a connection for user input through a keyboard, a mouse, and/or some other suitable input device. Further, the input/output unit 112 may send output to a printer. The display 114 may provide a mechanism to display information to a user. Examples of the input/output units 112 that facilitate establishing communications between a variety of devices within the computer system 100 include, without limitation, network cards, modems, and input/output interface cards. In addition, the computer system 100 can communicate with one or more networks such as a local area network (LAN), a general wide area network (WAN), and/or a public network (e.g., the Internet) via a network adapter (not shown in FIG. 3). It should be understood that although not shown, other hardware and/or software components could be used in conjunction with the computer system 100. Examples of such components include, but are not limited to: microcode, device drivers, redundant processing units, external disk drive arrays, RAID systems, tape drives, and data archival storage systems.

Instructions for the operating system, applications and/or programs may be located in the storage devices 116, which are in communication with the processing device 104 through the communications bus 102. In these illustrative examples, the instructions are in a functional form on the persistent storage 108. These instructions may be loaded into the system memory 106 for execution by the processing device 104. The processes of the different embodiments may be performed by the processing device 104 using computer implemented instructions, which may be located in a memory, such as the system memory 106. These instructions are referred to as program code, computer usable program code, or computer readable program code that may be read and executed by a processor in the processing device 104. The program code in the different embodiments may be embodied on different physical or tangible computer readable media, such as the system memory 106 or the persistent storage 108.

The program code 118 may be located in a functional form on the computer readable media 120 that is selectively removable and may be loaded onto or transferred to the computer system 100 for execution by the processing device 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the computer system 100. In some instances, the computer readable storage media 124 may not be removable from the computer system 100.

Alternatively, the program code 118 may be transferred to the computer system 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or computer system through the computer readable signal media 126 for use within the computer system 100. For instance, program code stored in a computer readable storage medium in a server computer system may be downloaded over a network from the server to the computer system 100. The computer system providing the program code 118 may be a server computer, a client computer, or some other device capable of storing and transmitting the program code 118.

The program code 118 may include one or more program modules (not shown in FIG. 3) that may be stored in system memory 106 by way of example, and not limitation, as well as an operating system, one or more application programs, other program modules, and program data. Each of the operating systems, one or more application programs, other program modules, and program data or some combination thereof, may include an implementation of a networking environment. The program modules of the program code 118 generally carry out the functions and/or methodologies of embodiments as described herein.

The different components illustrated for the computer system 100 are not meant to provide architectural limitations to the manner in which different embodiments may be implemented. The different illustrative embodiments may be implemented in a computer system including components in addition to or in place of those illustrated for the computer system 100.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many known electronic database storage systems store data information, usually in a plurality of sections which are located in physical storage proximate to each other. Those sections are referred to as "pages," where a page is a predefined value of physical storage capacity, e.g., and without limitation, 8 kilobytes (KB). The data in the storage systems is typically organized into tables that are defined through a plurality of rows and columns. Each page may include at least a portion of the table rows, where the logical aspects of the table rows may overlap multiple pages such that a table extends across a plurality of pages. A plurality of tables define a table space, where the plurality of pages are also organized into table space, or page rows, not to be confused with the table rows. During usage of the database, read, write, and delete transactions are directed to particular pages in particular page rows where the affected data table rows reside. A modification of the data on the page or pages may cause a non-optimal physical storage image, because, for example, a deletion of some data may cause fragmentation problems. Further, for example if a page row is updated with a longer text string then originally presented, an "overflow record" might be generated, where within the data field a pointer to a new storage location that preserves sufficient storage space, is stored. In such cases a subsequent read operation on the original data field is redirected to the larger data field which results in two separate I/O operations, instead of the original singular I/O operation. So, exhaustive usage of a database may result in a quite fragmented storage image. The more fragmented the storage image is, the greater is the number of redirections. As a consequence, average access times for read and/or write operations may be increased relative to an "ideal" state.

In addition, the saved data may be organized such that particular pages are frequently accessed through a series of concurrent transactions or an extended sequence of serialized transactions. Since the pages are representations of physical storage volumes, the transaction traffic in the vicinity of the respective pages may induce bottlenecks, thereby increasing the transaction wait time. In addition, the concurrent and serialized transactions from one or more application processes require the use of locks on the affected data to maintain concurrency of the data therein, where the active process "owns" or "holds" the lock. However, the locks may cause one or more types of contention, including, without limitation, suspension, timeout, and deadlock. Contention is a measurable or determinable feature. Once the extent of concurrent or serialized transactions reaches a threshold value, the page, and the row, may be designated as a "hot spot."

Furthermore, the data residing within the database storage system is indexed with respect to the physical location of the data. Database indexing is a data structure technique to efficiently retrieve records from the database files based on some attributes on which the indexing has been done such that a query may efficiently retrieve data from the database. Indexes are related to specific tables, and the relationships consist of one or more indexing attributes, e.g., a key field, where the key field is generally the primary key of the relation, where a key is a search value based on the tables' columns. As the size of the database grows, so does the size of the indexes. By comparing keys to the index, it is possible to find one or more database records with the same value. Since an index drastically speeds up data retrieval, it is important the correct indexes are defined for each table. The indexes also include a plurality of pointers, where the pointers hold the physical addresses of the respective records in the database. The use of pointers provides excellent data retrieval performance; however, it is at the expense of operations such as database loading and reorganization.

Therefore, many of these known database storage systems require periodic reorganizations of the stored data therein. During a reorganization, the logical and/or physical arrangement of the data in the database and the indexes is modified. Positive results of reorganization include the reduction of hot spots and restoring the proximity of related data as originally intended. In traditional practice, many types of reorganization have required denying access to a database (i.e., taking the database offline) during the reorganization. Taking a database offline can be unacceptable for a highly available (e.g., 24-hour) database, for example, a database serving electronic commerce or armed forces, or for a very large database. Accordingly, the combination of resource and temporal constraints may make necessary reorganization activities unattractive.

Evidence of a need for a reorganization of the stored data therein may be based on collected performance data of the database storage and the associated indexes. The collected performance data is typically at the table space or partition level, and the collected performance data, e.g., statistics of the data table or partition and respective index, is analyzed by one or more tools to determine a need to reorganize the stored data. For example, after many changes to table data, logically sequential data might be on nonsequential physical data pages, especially if many update operations created overflow records. When the data is organized in this way, the database manager must perform additional read operations to access the required data. Additional read operations are also required if many rows are deleted. In addition, many changes to table data can cause index performance to degrade, as indicated by notable and significant changes in the performance of queries that use the indexes. Accordingly, all of these issues cause more input/output operations and can degrade performance.

As previously described, the collected performance data is typically at the table space or partition level. However, workload performance issues may be more granular, i.e., such issues may be restricted to some small portion of the table or partition such that the affected workload performance is not reflected in table or partition level statistics. Moreover, in known database storage systems, reorganization activities may only be performed on a table or partition level basis, thereby necessitating constraining the operation of the database during the reorganization.

A system, computer program product, and method are disclosed and described herein directed toward driving database reorganizations subject to determined workloads, and, more specifically, to providing an online partial reorganization of a database to improve workload performance. Performance sensitive workloads are identified, where "performance sensitive workloads" are defined herein as those workloads that have been either previously identified as such by a user or have been determined to be performance sensitive based on empirical data collection. In some embodiments, for example, and without limitation, performance sensitive workloads include those workloads with user-identified runtime requirements that typically result in relatively high costs or extended execution times, even with at least satisfactory processing performance, and are therefore deemed to be performance sensitive by the user since failure to execute the respective workloads with a minimum level of execution performance could result in additional costs and delays. In some embodiments, the relationships between the runtime performance requirements and the actual runtime execution are discovered and brought to the attention of the user through the collected performance information. In addition, in some embodiments, the performance sensitive workloads are identified through one or more of a defined record access path, a record number or other record identifier, a record range within the table, a page range within the physical storage devices, a read page number, a list prefetch, a sequential I/O operation requirement, and any determined data record overflow condition, including an overflow ratio, hot spot conditions, and table space searching times. Accordingly, performance sensitive workloads are either explicitly identified prior to execution thereof or discovered during the collection of runtime measurements.

In at least one embodiment, to further the performance information collection, an access plan for each searching workload will be used to analyze methods used to access the tables and indexes, including, without limitation, index scans, table scans, list prefetches, and any non-matching index access. In addition, execution log information such as page I/O operations, CPU costs, overflow ratios, and execution times of the respective workloads are collected. Moreover, workload information such as data updates and insertion workloads, page I/O operations, and table space searching times are recorded. Furthermore, database statistics such as cluster ratios, record deletion numbers, record insertion numbers, and record overflow numbers are recorded. Accordingly, the performance information collection includes data collection from the execution log, workload operations, and database statistics.

In one or more embodiments, once the aforementioned performance information is collected, the workload performance information is analyzed to determine the nature of any indications of performance issues, which part of the stored data is affected, and what characteristic(s) of the table space, partitions, or indexes need to be improved. In general, there are four principle issues that are analyzed to determine potential workflow issues, where each issue has a general solution.

The first issue that is analyzed includes cluster ratios. A table's records may be arranged such that the records themselves are partially or wholly ordered in relation to a key field for the records, where the key field defines the associated index for that particular table, or a plurality of tables. A table that has significant ordering of its records in relation to the defined key is said to be clustered in relation to that key. A clustered table is more efficient than non-clustered tables, where clustered operations are carried out on the table based on the key. The clustering is measured through a cluster ratio that represents the degree of clustering in relation to the respective index, and in some embodiments, the cluster ratio is represented as a percentage of rows being stored in sequence on consecutive pages with regard to the sorting order of the index. The higher the value of the cluster ratio, the better the affected rows are ordered, or clustered, in the desired index-key sequence. If table rows are close to the desired index-key sequence, the table rows can be read from the affected data pages while the pages are in the buffer, thereby reducing or eliminating extraneous I/O operations. Indications of declining execution of performance sensitive workloads due to clustering issues include, without limitation, clustering of the respective rows, as indicated by a decreasing cluster ratio, is determined to be approaching or passing downward through a predetermined low threshold, an increasing number of page I/O operations is determined, and the respective table is scanned rather than using the index to execute certain query operations. In the event that one or more of the aforementioned indications are determined, a general, high-level solution includes a localized, partial reorganization of the table on the affected record ranges that may be executed to restore the desired clustering sequence of the affected records.

The second issue that is analyzed includes hot spots, where hot spots are previously defined herein. Indications of declining execution of performance sensitive workloads due to hot spot issues include, without limitation, extensive, or excessive, contention, and extended table space searching times. In the event that one or more of the aforementioned indications are determined, a general, high-level solution includes a localized, partial reorganization of the table on the affected page ranges that may be executed to spread out hot data into more of the table space and to increase the amount of free physical storage space available on the affected pages.

The third issue that is analyzed for includes data record overflow problems through indications including, without limitation, the ratio of the number of overflow records to the number of total records, i.e., an overflow ratio, approaches or exceeds an established threshold. In the event that one or more of the aforementioned indications are determined, a general, high-level solution includes a localized, partial reorganization of the table on the affected page ranges that may be executed to remove the overflow record and to increase the amount of free physical storage space available on the affected pages.

The fourth issue that is analyzed for includes data record space usage problems through indications including, without limitation, page I/O transaction numbers that approach or exceed an established threshold for the number of records in the affected table space. After a period of time, free space in the pages of the table space may become unevenly distributed among the pages through the addition and deletion of data and data records. In the event that the aforementioned indications are determined, a general, high-level solution includes a localized, partial reorganization of the table on the affected page ranges that may be executed to reorganize free space in the affected pages of the table space through defragmentation such that the free space is more evenly distributed to meet the desired distribution pattern for free space in the pages of the database table.

The quantity of four issues analyzed is not a limiting value. In addition, the serialized order of the analyses as presented herein is non-limiting, where, in at least some embodiments, the analyses are executed in parallel. Accordingly, indications of cluster ratio issues, hot spots, overflow issues, and space usage issues due to the performance information collection and analyses with respect to the performance sensitive workloads may be alleviated through localized, partial reorganization of the table on the affected record and page ranges.

Figure 4:
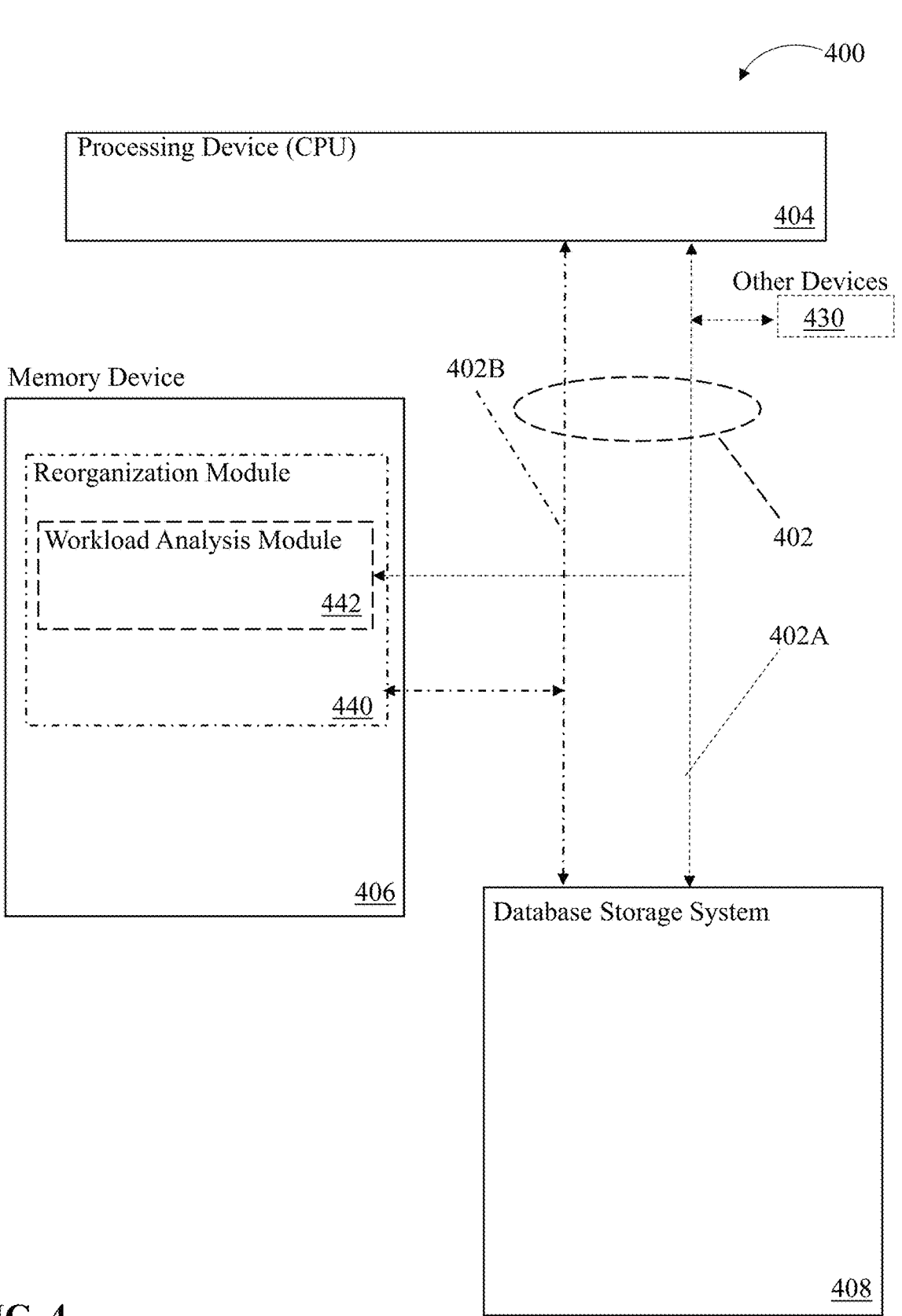
FIG. 4 is a schematic diagram illustrating a portion of the computer system/server shown in FIG. 3, to implement the processes described herein, in accordance with some embodiments of the present disclosure.

Referring to FIG. 4, a schematic diagram is provided illustrating a portion of the computer system/server, shown in FIG. 3 (as computer system/server 300) hereinafter referred to as the database partial reorganization system 400, to implement the processes described herein. Also referring to FIG. 3, the database partial reorganization system 400 includes at least one processing device 404 that is similar to the processing device 104, sometimes referred to as the central processing unit (CPU). The database partial reorganization system 400 also includes at least one memory device 406 that is similar to at least a portion of the system memory 106. The database partial reorganization system 400 further includes a database storage system 408 that is at least a portion of the persistent storage devices 108. The processing device 404, the memory device 406, and the database storage system 408 are communicatively and operably coupled through a communications bus 402 that is similar to the communications bus 102. The communications bus 402 is shown as two separate communications buses 402A and 402B to distinguish between the communications thereon, as discussed further herein; however, in some embodiments, all communications traffic occurs on a single communications bus 402 with the appropriate control thereof. Also coupled to the communications bus 402A are other devices 430 that may include, without limitation, the communications unit 110, the I/O unit 112, and the display 114, all as shown in FIG. 3 and not shown in FIG. 4. In one or more embodiments, one or more tools are resident within the memory device 406. Specifically, the tools include a reorganization module 440, that in turn includes an embedded workload analysis module 442. The workload analysis module 442 is communicatively coupled to the communications bus 402A and the reorganization module 440 is communicatively and operably coupled to the communications bus 402B. The reorganization module 440 and the workload analysis module 442 are discussed further herein. Accordingly, a database partial reorganization system 400 with tools that include the reorganization module 440 and the workload analysis module 442 are used to implement the online partial database reorganization as described herein to improve workload performance, including performance sensitive workloads.

Figure 5:
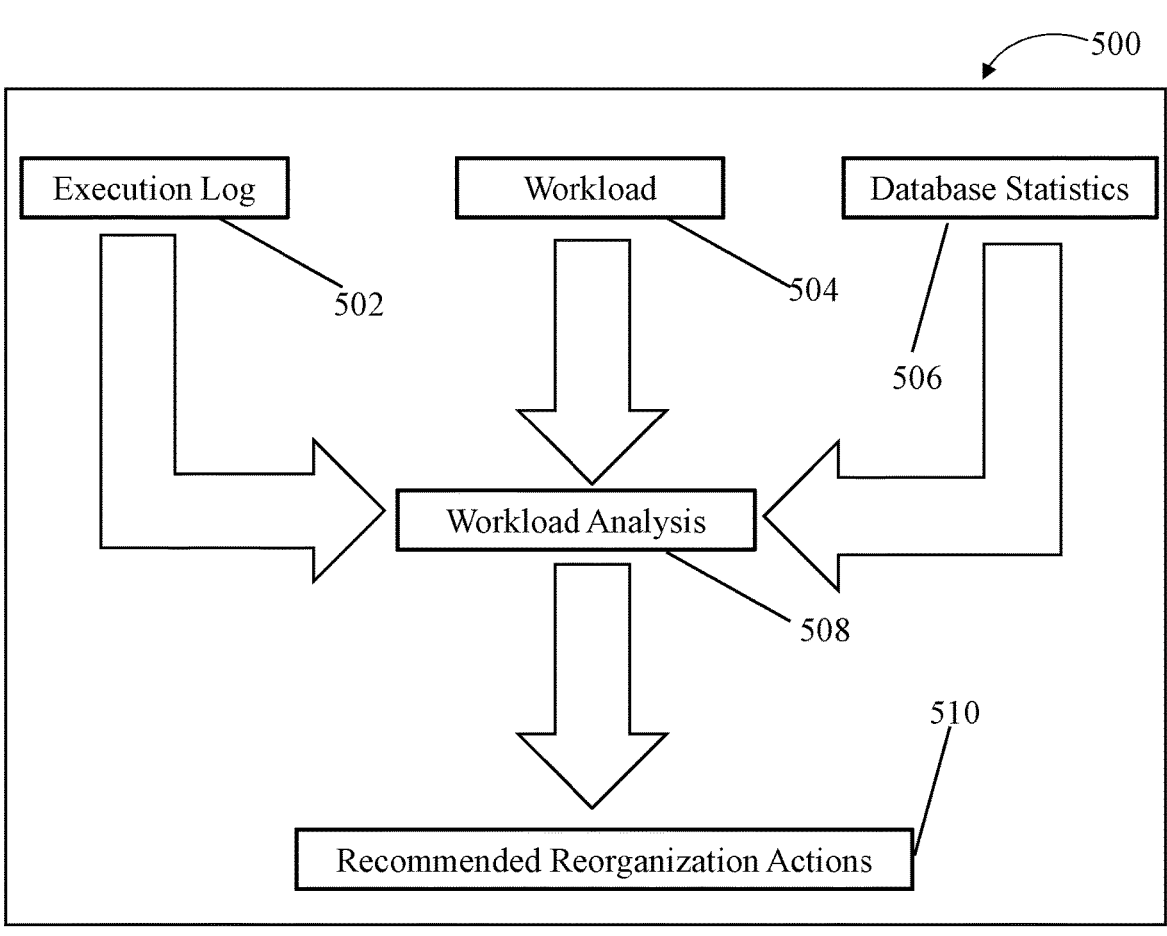
FIG. 5 is a high-level flowchart illustrating a process for driving workloads-based online partial database reorganizations to improve workload performance, in accordance with some embodiments of the present disclosure.
Figure 6A:
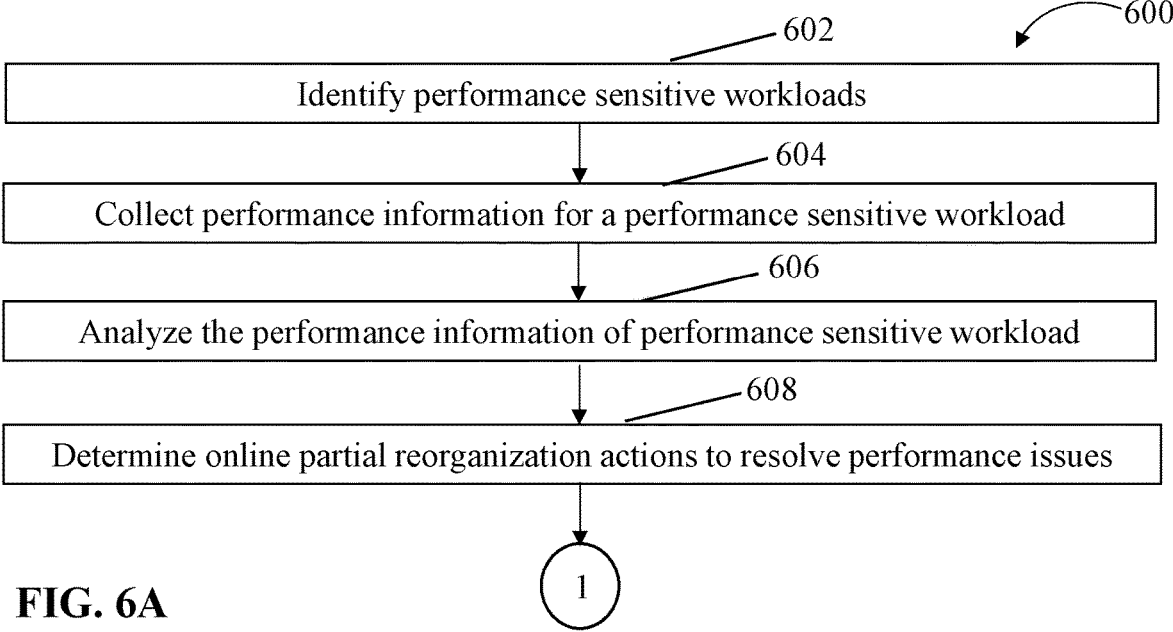
FIG. 6A is a more detailed flowchart illustrating the process 600 for driving workloads-based online partial database reorganizations shown in FIG. 5, in accordance with some embodiments of the present disclosure.
Figure 6B:
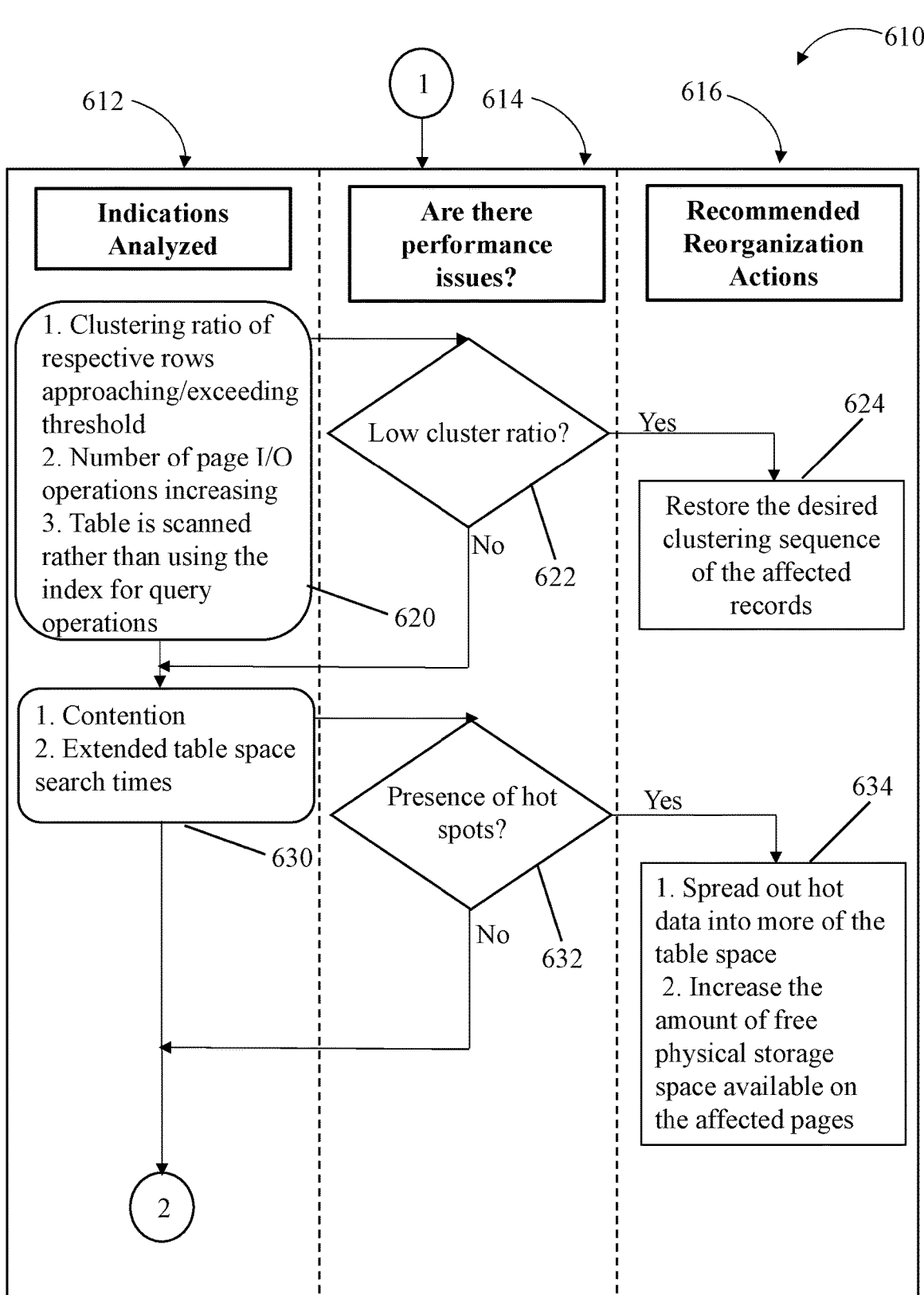
FIG. 6B is a continuation of the flowchart from FIG. 6A, in accordance with some embodiments of the present disclosure.

FIG. 5 is a high-level flowchart illustrating a process 500 for driving workloads-based online partial database reorganizations to improve workload performance. FIGS. 6A-6C show a more detailed flowchart illustrating the process 600 for driving workloads-based online partial database reorganizations shown in FIG. 5. Referring to FIG. 6A, the process 600 includes identifying 602 performance sensitive workloads. In some embodiments, "performance sensitive workloads" are defined as those workloads that have been either previously identified as such by a user or have been determined to be performance sensitive based on empirical data collection. The empirical data collection may be fully automated. In some embodiments, for example, and without limitation, performance sensitive workloads include those workloads with user-identified runtime requirements that typically result in relatively high costs or extended execution times, even with at least satisfactory processing performance, and are therefore deemed to be performance sensitive by the user since failure to execute the respective workloads with a minimum level of execution performance could result in additional costs and delays. In some embodiments, the relationships between the runtime performance requirements and the actual runtime execution are discovered and brought to the attention of the user through the collected performance information. In addition, in some embodiments, the performance sensitive workloads are identified through one or more of a defined record access path, a record number or other record identifier, a record range within the table, a page range within the physical storage devices, a read page number, a list prefetch, a sequential I/O operation requirement, and any determined data record overflow condition, including an overflow ratio, hot spot conditions, and table space searching times. Accordingly, performance sensitive workloads are either explicitly identified prior to execution thereof or discovered during the collection of runtime measurements.

Also referring to FIG. 4, in some embodiments, the process 600 includes collecting 604 performance information for the performance sensitive workloads associated with one or more portions of the respective database. The information sources are identified in FIG. 5. Initially, in at least one embodiment, to further the performance information collection, an access plan for each searching workload will be used to analyze methods used to access the tables and indexes, including, without limitation, index scans, table scans, list prefetches, and any non-matching index access. In addition, an execution log 502 is accessed by the workload analysis module 442 through the communications bus 402A. At least a portion of the execution log 502 information includes, without limitation, page I/O operations, CPU costs, overflow ratios, and execution times of the respective workloads. Moreover, workload information 504 is accessed by the workload analysis module 442 through the communications bus 402A. At least a portion of the workload information 504 includes, without limitation, data updates and insertion workloads, page I/O operations, and table space searching times. Furthermore, database statistics 506 are accessed by the workload analysis module 442 through the communications bus 402A. At least a portion of the database statistics 506 includes, without limitation, cluster ratios, record deletion numbers, record insertion numbers, and record overflow numbers. Accordingly, the performance information collection includes data collection from the execution log 502, workload information 504, and database statistics 506.

In one or more embodiments, once the aforementioned performance information is collected 604, the collected workload performance information is analyzed 508/606 by the workload analysis module 442 to determine the nature of any indications of performance declines. In at least some embodiments, the analyses are conducted in a fully auto- mated manner, and in some embodiments, analyzed con- tinually. In addition, subject to the determined performance declines, a determination is made with respect to which of the one or more database portions are affected by the determined performance declines, i.e., the portion of the stored data that is affected. Moreover, subject to the database portions determination, classifying the determined perfor- mance declines, i.e., determining what characteristic(s) of the table space, partitions, or indexes need to be improved. In general, there are four principle issues that are analyzed to determine potential workflow issues, where each issue has a general solution, where each performance issue is described further herein. In at least one embodiment, the process 600 includes determining 608 the recommended online partial reorganization actions 510 to resolve the four performance issues, as described further herein.

Continuing to refer to FIG. 6A, and referring to FIG. 6B, the analyzing operation 606 of the performance information and the determining operation 608 of the recommended online partial reorganization actions to resolve the four performance issues are discussed further in a set 610 of analyses and actions. The set 610 of analyses and actions is divided into three sections, i.e., the indications analyzed 612 for each of the four performance issues, determinations 614 of the presence, or lack of, performance issues, and the recommended reorganization actions 616. The determina- tions associated with the operations 602, 604, 606, and 608 may be fully automated. The recommended online partial reorganization actions may be fully automated. The quantity of four issues analyzed is not a limiting value. In addition, the serialized order of the analyses as presented herein is non-limiting, where, in at least some embodiments, the analyses are executed in parallel. Accordingly, indications of cluster ratio issues, hot spots, overflow issues, and space usage issues due to the performance information collection and analyses with respect to the performance sensitive workloads may be alleviated through localized, partial reor- ganization of the table on the affected record and page ranges.

In some embodiments, the first issue that is analyzed includes cluster ratios. Indications 620 of declining perfor- mance of performance sensitive workloads due to clustering issues include, without limitation, analyzing the clustering ratios of the respective rows. Another indication 620 ana- lyzed includes the number of I/O operations executed for particular workloads. A further indication 620 analyzed includes observing the portion of the workloads to distin- guish between table scans for queries versus using the respective index for the queries. A determination operation 622 is executed to determine 622 if the cluster ratio is low enough to warrant a reorganization. Specifically, if the indications 620 point toward one or more of a decreasing cluster ratio that is determined to be approaching or passing downward through a predetermined low threshold value, an increasing number of page I/O operations, and the scans of the respective table are increasing rather than using the respective index to execute certain query operations. If the outcome of the determination operation 622 is "yes," the general, high-level solution includes a localized, partial reorganization of the table on the affected record ranges that may be executed to restore 624 the desired clustering sequence of the affected records. Such partial reorganization to restore 624 the desired clustering sequence may be implemented through a user interface or may be automated.

Figure 7:
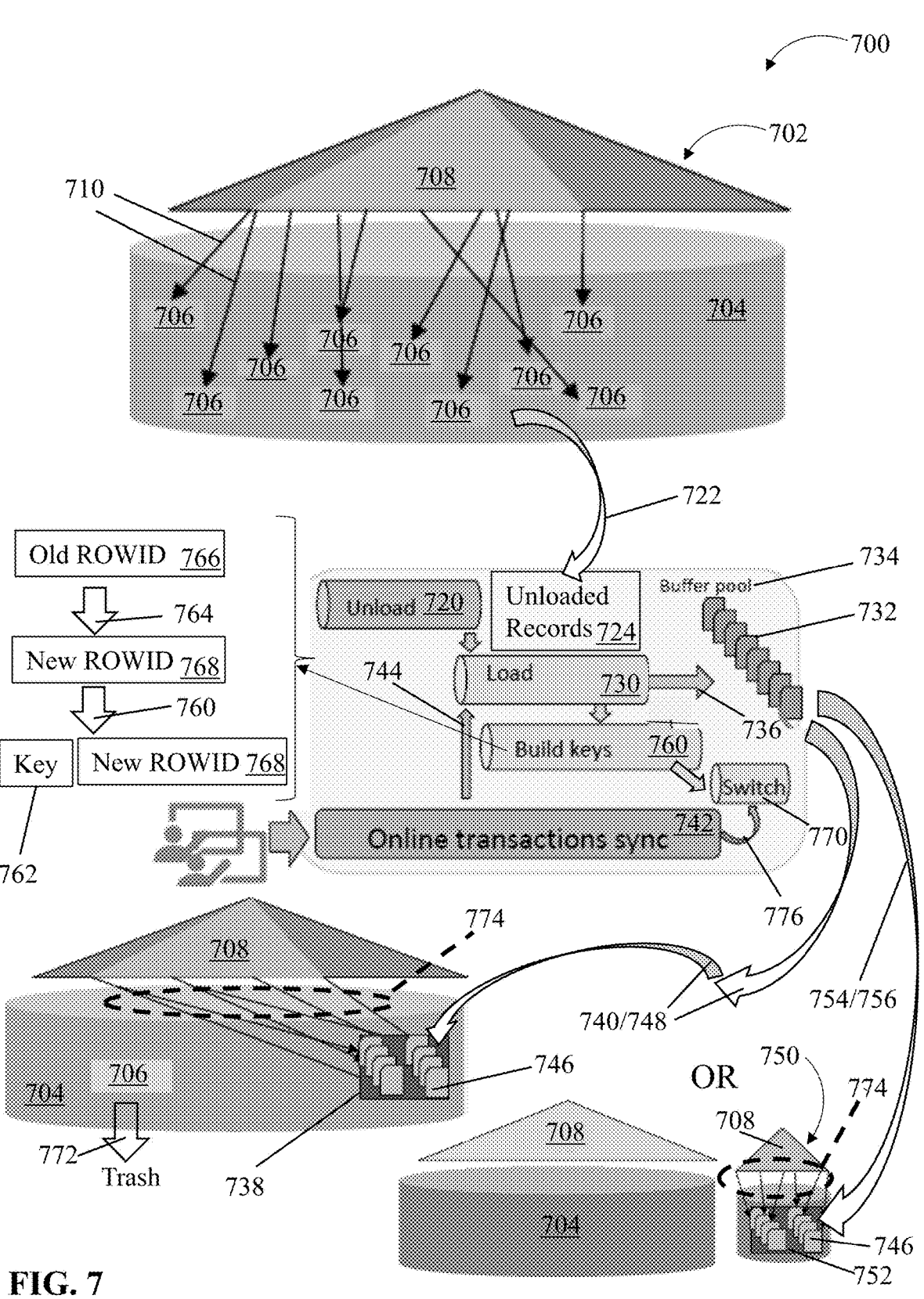
FIG. 7 is a schematic diagram illustrating a process for restoring the desired clustering sequence of the affected records to mitigate low cluster ratio determinations, in accordance with some embodiments of the present disclosure.

Referring to FIG. 7, a schematic diagram is provided illustrating a process 700 for restoring the desired clustering sequence of the affected records to mitigate low cluster ratio determinations. Also referring to FIG. 4, a portion of a database 702 is shown with a table space 704, a plurality of data records 706, an index 708, and a plurality of pointers 710 (only two labeled) extending from the index 708 to the respective individual records 706. The index 708 and the table space 704 reside within the database storage system 408.

In some embodiments, the process 700 includes unload- ing 720 (i.e., copying or scanning) the respective records 706 within the determined record range from the table space 704, through the reorganization module 440, to temporarily reside within the memory device 406, as shown by an arrow 722, thereby defining a set of unloaded records 724. The records 706 are selected to be unloaded through the respec- tive cluster index access paths (not shown) or using list prefetch features to unload 720 the records 706. As dis- cussed further herein, the records 706 remain in use until the switching activities are concluded. Accordingly, the respec- tive records 706 to be reorganized are copied from their respective portions of the table space 704 into the memory device 406.

In at least some embodiments, the process 700 also includes loading 730 the unloaded records 724 into new pages 732 within a buffer pool 734 as shown by the arrow 736. In some embodiments, the buffer pool 734 is resident within the memory device 406 and in some embodiments, it is resident within the table space 704. Prior to loading 730, the storage space in the table space 704 necessary to receive the unloaded records 724 is calculated, including appropri- ate values for the percentage of free space on each page to remain after loading 730 and the number of free pages to be added. The reserved pages 732 are allocated within a con- tinuous portion 738 of the table space 704 as indicated by arrows 740, where, in some embodiments, the continuous portion 738 is an existing partition. In some embodiments, a new partition (discussed further herein) is created. The pages 732 are set as "unavailable" to prevent inadvertent use of the reserved and allocated page space within the continu- ous portion 738 and pages 732 due to the database storage system 408 not being taken off line while online transaction synchronizations 742 are applied (as indicated by an arrow 744) to the records 724, i.e., the routine data read, write, and delete activities continue. While not shown in FIG. 7, the records 706 resident within the table space 704 are updated in parallel with the unloaded records 724 to facilitate main- taining synchronization of the data therein until the switch- ing activities (discussed further herein) are completed. The unloaded records 724 are loaded 730 into the new pages 732 within the buffer pool 734. In some embodiments, the pages 746 with the loaded records are written out 748, i.e., transmitted, to the reserved continuous portion 738 of the table space 704. In some embodiments, a new partition 750 external to the table space 704 is created, and the pages 746 are allocated within a continuous portion 752 of the new partition 750 as indicated by arrow 754. The pages 746 with the loaded records are written out 756, i.e., transmitted, to the reserved continuous portion 752 of the new partition 750. Accordingly, the respective records 724 are loaded into the respective pages 732, and the loaded pages 746 are transmitted to the table space 704 or new partition 750, while the online transactions synchronizations 742 continue to be applied to the affected records to mitigate potential for incongruent data.

In one or more embodiments, keys 762 associated with the index 708 are built 760 to reflect the new locations of the pages 746. A map is built 764 between the old ROWID values 766 and the new ROWID values 768. The index keys 762 are built 760 for all of the indexes 708 in the affected range, where the index keys 762 are now related to the new ROWID values 768. Accordingly, the transition of the positioning of the pages 746 includes generating new index keys 762 for each of the affected rows in the data table.

In at least some embodiments, the process 700 further includes switching 770 at the data page level the records loaded within the pages 746 in the proper clustering order. The old records 706 (only one shown) are locked (thereby ending the online transaction synchronization 742 thereof) and deleted 772 from the table space 704, and the index 708 is updated to shift the respective pointers 710 to the new locations of the respective records, i.e., generate modified pointers 774. The new pages 746 are made available for further updates through online transactions synchronization 742 now reading and writing 776 to the records in the new pages 732. Accordingly, a localized, partial reorganization of the clustered data records on the affected record ranges may be executed to restore the desired clustering sequence of the affected records.

Referring again to FIG. 6B, if the outcome of the determination operation 622 is "no," in some embodiments, the process 600 proceeds to the second issue that is analyzed that includes hot spots, where hot spots are previously defined herein. Indications 630 of declining execution of performance sensitive workloads due to hot spot issues include, without limitation, extensive, or excessive, contention, and extended table space searching times. A determination operation 632 is executed to determine 632 if the presence of hot spots in the table space is sufficiently negatively affecting performance to warrant a reorganization. Specifically, the indications 630 may point toward one or more of excessive contention and extended table space search times that may be determined to drive performance to approach or pass downward through a predetermined low threshold value. If the outcome of the determination operation 632 is "yes," the general, high-level solution includes a localized, partial reorganization of the table on the affected page ranges that may be executed to spread out 634 hot data into more of the table space and increase the amount of free physical storage space available on the affected pages. Such partial reorganization to spread out 634 hot data may be implemented through a user interface or may be automated.

Figure 8:
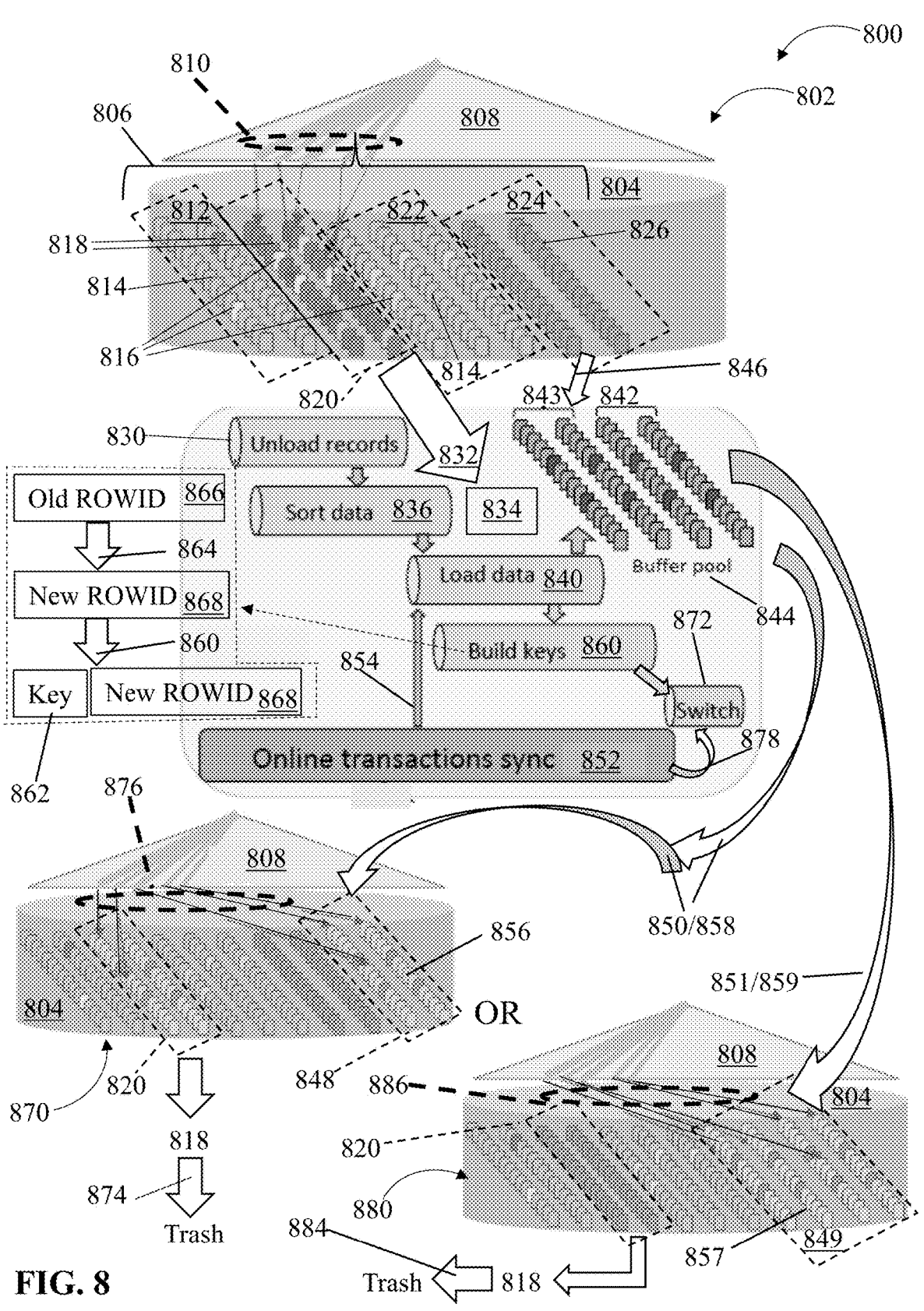
FIG. 8 is a schematic diagram illustrating a process for mitigating performance issues related to hot spots, in accordance with some embodiments of the present disclosure.

Referring to FIG. 8, a schematic diagram is provided illustrating a process 800 for mitigating performance issues related to hot spots. Also referring to FIG. 4, a portion of a database 802 is shown with a table space 804, a plurality of pages 806, an index 808, and a plurality of pointers 810 extending from the index 808 to the respective individual pages 806. The index 808 and the table space 804 reside within the database storage system 408.

The plurality of pages 806 includes a plurality of page rows (not labeled), where each row includes 16 pages, and the number of data pages per row is non-limiting. The pages 806 include a first page grouping 812 that includes two rows including 30 lightly loaded pages 814, one intermediately loaded page 816, and one hot page 818. In addition, the pages 806 include a second page grouping 820 that includes two rows including 6 intermediately loaded pages 816, and 26 hot pages 818. Moreover, the pages 806 include a third page grouping 822 that includes 3 rows including 5 intermediately loaded pages 816 and 43 lightly loaded pages 814. Furthermore, the pages 806 include a fourth page grouping 824 that includes 32 substantially free pages 826. As used herein, the term "lightly loaded" is indicative of some stored data therein with occasional read/write/deletion accesses. Similarly, the term "intermediately loaded" is indicative of an intermediate amount of stored data therein with intermediate read/write/deletion accesses. The term "hot pages" is described elsewhere herein. As used herein, the term "substantially free" is indicative of pages that store no data or metadata thereon and experience substantially infrequent access. The plurality of pointers 810 includes five pointers 810, each pointer 810 associated with a hot page 818 in the second page grouping 820. While the illustrated embodiment includes the pages 806 distributed in a particular organization, any number of pages 806 in any configuration are used that enables operation of the database partial reorganization system 400 as described herein.

In some embodiments, the process 800 includes unloading 830 (i.e., copying or scanning) the respective pages 806 in the identified page range from the table space 804, through the reorganization module 440, to temporarily reside within the memory device 406 as shown by an arrow 832, thereby defining a set of unloaded records 834. The records 806 are selected to be unloaded through the respective hot page determination mechanisms or using list prefetch features to unload 830 the records 806. As discussed further herein, the records in the affected pages 806 remain in use until the switching activities are concluded. Accordingly, the respective records 806 to be reorganized are copied from their respective portions of the table space 804 into the memory device 406.

In one or more embodiments, the records (not shown) within the affected pages, i.e., the hot pages 818 from the second page grouping 820, are sorted 836 as needed to properly cluster the records within the affected pages. Accordingly, any clustering of the records is completed prior to loading the records, as described further.

In at least some embodiments, the process 800 also includes loading 840 the unloaded records 834 into the assigned pages. In some embodiments, only existing pages such as the 32 substantially free pages 826 are used. In some embodiments, only new substantially free pages assigned specifically for the present process 800 are used and any existing pages do not receive any of the unloaded records 834. In some embodiments, a combination of existing and new pages are assigned. The embodiments that include only new substantially free pages are discussed, where those embodiments that use only existing pages are treated similarly. In addition, embodiments that include a combination of existing and new pages are discussed.

Therefore, for those embodiments where only new substantially free pages are used, new substantially free pages 842 are created in a buffer pool 844. In some embodiments, the buffer pool 844 is resident within the memory device 406, and in some embodiments it is resident within the table space 804. Prior to loading 840, the storage space in the table space 804 necessary to receive the unloaded records 834 is calculated, including appropriate values for the percentage of free space on each page to remain after loading 840 and the number of free pages to be added.

In those embodiments that include a first post-switching configuration 870 of the table space 804, where only the new substantially free reserved pages 842 are in the buffer pool 844, the reserved pages 842 are allocated within a continuous portion 848 of the table space 804 as indicated by arrows 850, where, in some embodiments, the continuous portion 848 may be an existing partition (not shown). In some embodiments, a new partition (as discussed with respect to FIG. 7) is created. The pages 842 are set as "unavailable" to prevent inadvertent use of the reserved and allocated page space within the continuous portion 848 and the reserved pages 842 due to the database storage system 408 not being taken off line while online transaction synchronizations 852 are applied (as indicated by an arrow 854) to the unloaded records 834, i.e., the routine data read, write, and delete activities continue. While not shown in FIG. 8, the records resident within the affected pages 806 in the table space 804 are updated in parallel with the unloaded records 834 to facilitate maintaining synchronization of the data therein until the switching activities (discussed further herein) are completed. In at least one embodiment, the unloaded records 834 are loaded 840 into the new pages 842 within the buffer pool 844.

In at least one embodiment, the allocation of the unloaded records 834 is such that the elimination of hot spots is enabled through the appropriate spreading of the unloaded records 834. In some embodiments, the pages 856 with the unloaded records 834 are written out 858, i.e., transmitted, to the reserved continuous portion 848 of the table space 804. Accordingly, the respective unloaded records 834 are loaded into the respective pages 842, and the loaded pages 856 are transmitted to the table space 804 or new partition (not shown), while the online transactions synchronizations 852 continue to be applied to the affected records to mitigate a potential for incongruent data.

In one or more embodiments, keys 862 associated with the index 808 are built 860 to reflect the new locations of the loaded pages 856. A map is built 864 between the old ROWID values 866 and the new ROWID values 868. The index keys 862 are built 860 for all of the indexes 808 in the affected range, where the index keys 862 are now related to the new ROWID values 868. Accordingly, the transition of the positioning of the loaded pages 856 includes generating new index keys 862 for each of the affected rows in the data table.

In at least some embodiments, the process 800 further includes switching 872 at the data page level the records loaded within the loaded pages 856 in the proper clustering order. A portion of the old records, i.e., the records in the 26 hot pages 818 in the second page grouping 820 are locked (thereby ending the online transaction synchronization 852 thereof) and deleted 874 from the table space 804, and the index 808 is updated to shift a portion of the respective pointers 810 to the new locations of the respective records, i.e., generate modified pointers 876. The new pages 856 are made available for further updates through online transactions synchronization 852 now reading and writing 878 to the records. Accordingly, a localized, partial reorganization of the table space 804 on the affected page ranges may be executed to spread out hot data into more of the table space 804 and increase the amount of free physical storage space available on the affected pages.

For those embodiments where a combination of existing and new pages are assigned, new substantially free pages 842 are created in the buffer pool 844. In addition, existing pages 843 (that include the 32 substantially free pages 826) are added within the buffer pool 844, as indicated by an arrow 846. Prior to loading 840, the storage space in the table space 804 necessary to receive the unloaded records 834 is calculated, including appropriate values for the percentage of free space on each page to remain after loading 840 and the number of free pages to be added.

In those embodiments that include a second post-switching configuration 880 of the table space 804, where the new substantially free reserved pages 842 and existing substantially free reserved pages 843 are in the buffer pool 844, the reserved pages 842 are allocated within a continuous portion 849 of the table space 804 as indicated by arrow 851, where, in some embodiments, the continuous portion 849 may be an existing partition (not shown). In some embodiments, a new partition (as discussed with respect to FIG. 7) is created. The pages 842 and 843 are set as "unavailable" to prevent inadvertent use of the reserved and allocated page space within the continuous portion 849 and the reserved pages 842 and 843 due to the database storage system 408 not being taken off line while online transaction synchronizations 852 are applied (as indicated by the arrow 854) to the unloaded records 834, i.e., the routine data read, write, and delete activities continue. While not shown in FIG. 8, the records resident within the affected pages 806 in the table space 804 are updated in parallel with the unloaded records 834 to facilitate maintaining synchronization of the data therein until the switching activities (discussed further herein) are completed. In at least one embodiment, the unloaded records 834 are loaded 840 into the new pages 842 and the existing pages 843 within the buffer pool 844.

In at least one embodiment, the allocation of the unloaded records 834 is such that the elimination of hot spots is enabled through the appropriate spreading of the unloaded records 834. In some embodiments, the pages 857 with the unloaded records 834 are written out 859, i.e., transmitted, to the reserved continuous portion 849 of the table space 804. Accordingly, the respective unloaded records 834 are loaded into the respective pages 842 and 843, and the loaded pages 857 are transmitted to the table space 804 or new partition (not shown), while the online transactions synchronizations 852 continue to be applied to the affected records to mitigate potential for incongruent data.

In one or more embodiments, keys 862 associated with the index 808 are built 860 to reflect the new locations of the loaded pages 857. A map is built 864 between the old ROWID values 866 and the new ROWID values 868. The index keys 862 are built 860 for all of the indexes 808 in the affected range, where the index keys 862 are now related to the new ROWID values 868. Accordingly, the transition of the positioning of the loaded pages 857 includes generating new index keys 862 for each of the affected rows in the data table.

In at least some embodiments, the process 800 further includes switching 872 at the data page level the records loaded within the loaded pages 857 in the proper clustering order. The old records, i.e., the records in the 26 hot pages 818 in the second page grouping 820 are locked (thereby ending the online transaction synchronization 852 thereof) and deleted 884 from the table space 804, and the index 808 is updated to shift the respective pointers 810 to the new locations of the respective records, i.e., generate modified pointers 886. The pages 857 are made available for further updates through online transactions synchronization 852 now reading and writing 878 to the records. Accordingly, a localized, partial reorganization of the table space 804 on the affected page ranges may be executed to spread out hot data into more of the table space 804 and increase the amount of free physical storage space available on the affected pages.

The embodiments including the first post-switching configuration 870 of the table space 804 (where only the new substantially free reserved pages 842) and the second post-switching configuration 880 of the table space 804 (where the new substantially free reserved pages 842 and existing substantially free reserved pages 843 are both used,) are distinguished. For example, in the first post-switching configuration 870, not all of the affected records in the second page grouping 820 are transferred to the loaded pages 856, as indicated by the modified pointers 876. In contrast, in the second post-switching configuration 880, all of the affected records in the second page grouping 820 are transferred to the loaded pages 857, as indicated by the modified pointers 886. The benefit of the first post-switching configuration 870 is that the fourth page grouping 824 maintains the 32 substantially free pages 826 while removing the hot spots in the second page grouping 820. The benefit of the second post-switching configuration 880 is that any potential hot spots in the loaded pages 856 are mitigated through further spreading out the affected records.

Referring again to FIG. 6B, if the outcome of the determination operation 632 is "no," in some embodiments, the process 600 proceeds to the third issue that is analyzed that includes data record overflow problems. Referring to FIG. 6C, indications 640 of declining execution of performance sensitive workloads due to the ratio of the number of overflow records to the number of total records, i.e., an overflow ratio, approaching or exceeding an established threshold. A determination operation 642 is executed to determine 642 if the presence of a high overflow ratio is sufficiently negatively affecting performance to warrant a reorganization. If the outcome of the determination operation 642 is "yes," the general, high-level solution includes a localized, partial reorganization of the table on the affected page ranges that may be executed to one or more of remove 644 the overflow records and increase the amount of free physical storage space available on the affected pages and increase the amount of free physical storage space available on the affected pages. Such partial reorganization to remove 644 the overflow records and increase the amount of free physical storage space may be implemented through a user interface or may be automated.

Figure 9:
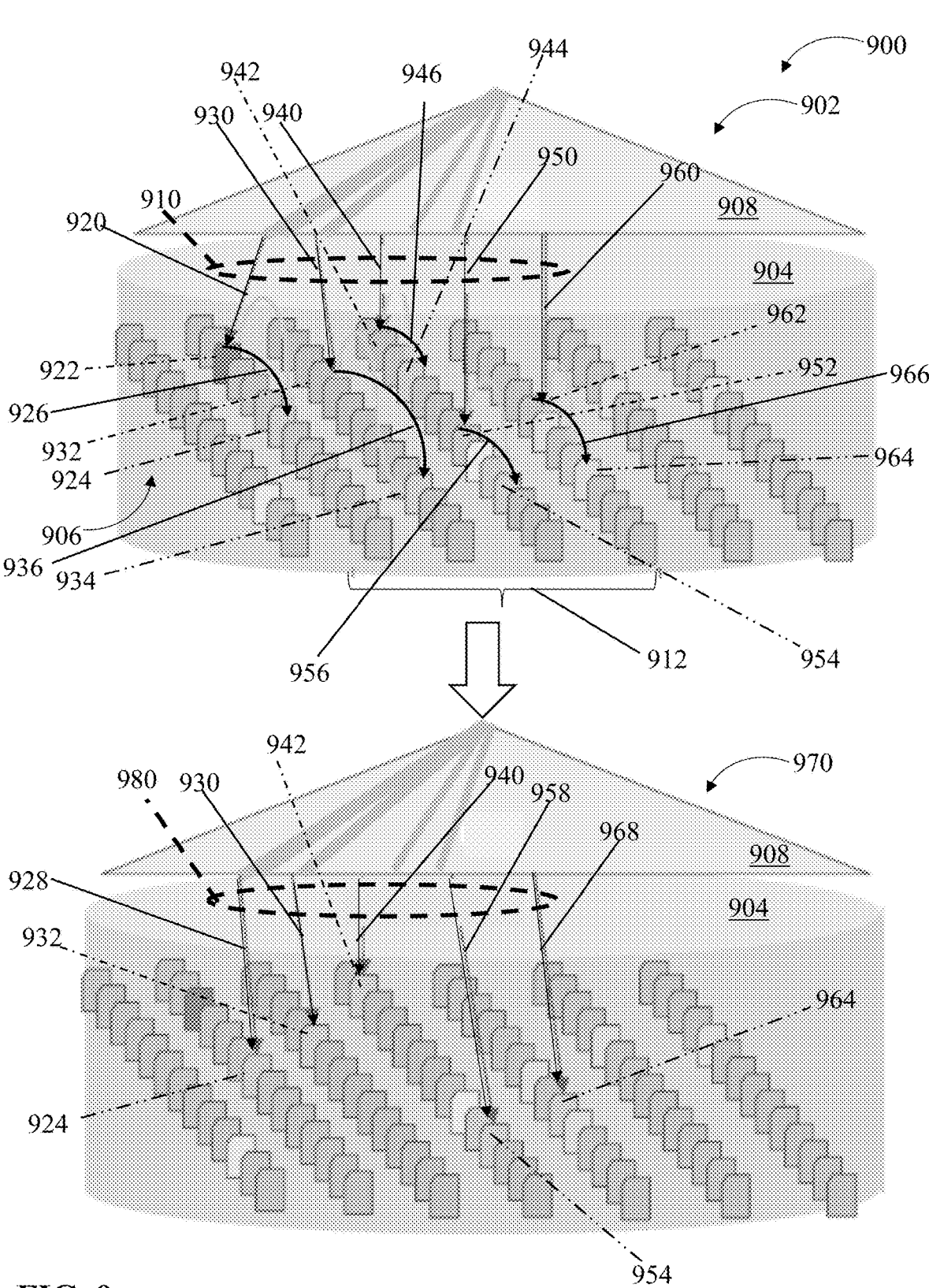
FIG. 9 is a schematic diagram illustrating a process for mitigating performance issues related to a high overflow ratio, in accordance with some embodiments of the present disclosure.

Referring to FIG. 9, a schematic diagram is provided illustrating a process 900 for mitigating performance issues related to high overflow ratios. Also referring to FIG. 4, a portion of a database 902 is shown with a table space 904, a plurality of pages 906, an index 908, and a plurality of pointers 910 extending from the index 908 to the respective individual pages 906. The index 908 and the table space 904 reside within the database storage system 408.

A range 912 of pointer records are selected and scanned to determine the respective pointer 910 records. As shown, there are five pointer records 910 in the range 912 that are associated with overflow records. A first pointer 920 is directed toward a first page 922 that is associated with a first overflow page 924 that includes the respective overflow record as indicated by the overflow arrow 926. The first page 922 is a hot page. A second pointer 930 is directed toward a second page 932 that is associated with a second overflow page 934 that includes the respective overflow record as indicated by the overflow arrow 936. The second page 932 is a lightly loaded page. A third pointer 940 is directed toward a third page 942 that is associated with a third overflow page 944 that includes the respective overflow record as indicated by the overflow arrow 946. The third page 942 is a lightly loaded page. A fourth pointer 950 is directed toward a fourth page 952 that is associated with a fourth overflow page 954 that includes the respective overflow record as indicated by the overflow arrow 956. The fourth page 952 is a heavily loaded page, but not a hot spot. A fifth pointer 960 is directed toward a fifth page 962 that is associated with a fifth overflow page 964 that includes the respective overflow record as indicated by the overflow arrow 966. The fifth page 962 is an intermediately loaded page. Accordingly, the database 902 includes a sufficient number of overflow records 924-964 within the table space 904 to warrant a localized, partial reorganization of the table space 904 on the affected page ranges that may be executed to remove the overflow records and increasing the amount of free physical storage space available on the affected pages.

In at least one embodiment, if either of the first through fifth pages 922-962, has sufficient space to store the respective overflow records without exceeding any established parameters, the respective overflow records are transferred to the respective first through fifth pages 922-962, and the respective overflow pages no longer contain the overflow records. In the event that there is insufficient space, the index 908 is updated to direct the respective pointers 920-960 to point directly to the respective overflow pages 924-964, and the previous pointer record is deleted, thereby re-designating the overflow pages to pages. Accordingly, in one or more embodiments, a post-high overflow ratio database 970 is created.

In at least one embodiment, the post-high overflow ratio database 970 includes a one or more modified pointers 980. Specifically, since the first page 922 is a hot page, the first page 922 cannot receive the overflow records from the first overflow page 924, and a new pointer 928 is created to point toward the first overflow page 924, and the pointer 920 is deleted. Also, since the second page 932 is a lightly loaded page, the overflow records in the second overflow page 934 are transferred to the second page 932. Further, since the third page 942 is a lightly loaded page, the overflow records in the third overflow page 944 are transferred to the third page 942. In addition, since the fourth page 952 is a heavily loaded page, the fourth page 952 cannot receive the overflow records from the fourth overflow page 954, and a new pointer 958 is created to point toward the fourth overflow page 954, and the pointer 950 is deleted. Moreover, since the fifth page 962 is an intermediately loaded page, the fifth page 962 is determined that it cannot receive the overflow records from the fifth overflow page 964, and a new pointer 968 is created to point toward the fifth overflow page 964, and the pointer 960 is deleted. Accordingly, the database 902 includes a sufficient number of overflow records 924-964 within the table space 904 to warrant a localized, partial reorganization of the table space 904 on the affected page ranges that may be executed to remove the overflow records and to increase the amount of free physical storage space available on the affected pages.

Referring again to FIG. 6C, if the outcome of the determination operation 642 is "no," in some embodiments, the process 600 proceeds to the fourth issue that is analyzed that includes data record space usage problems. Indications 650 of declining execution of performance sensitive workloads due to the data record space usage problems include page I/O transaction numbers that approach or exceed an established threshold for the number of records in the affected table space. A determination operation 652 is executed to determine 652 if the presence of space usage issues is sufficiently negatively affecting performance to warrant a reorganization. If the outcome of the determination operation 652 is "yes," the general, high-level solution includes a localized, partial reorganization of the table on the affected page ranges that may be executed to reorganize free space in the affected pages of the table space through defragmentation 654 such that the free space is more evenly distributed to meet the desired distribution pattern for free space in the pages of the database table. Such partial reorganization to defragment 654 the table space may be implemented through a user interface or may be automated.

Figure 10:
FIG. 10 is a schematic diagram illustrating a process for mitigating performance issues related to space usage issues, in accordance with some embodiments of the present disclosure.

Referring to FIG. 10, a schematic diagram is provided illustrating a process 1000 for mitigating performance issues related to space usage issues. Also referring to FIG. 4, a portion of a database 1002 is shown with a table space 1004, a range of a plurality of pages 1006, and an index 1008. The index 1008 and the table space 1004 reside within the database storage system 408.

The range of pages 1006 includes a plurality of page rows (not labeled) (9 shown), where each row includes 16 pages, and the number of page rows and the number of data pages per row is non-limiting. The range of pages 1006 includes a first page grouping, i.e., a first sub-range 1010 of pages that includes three rows. Similarly, the range of pages 1006 includes a second page grouping, i.e., a second sub-range 1012 of pages, and a third page grouping, i.e., a third sub-range 1014 of pages, also each including three rows of pages. The range of pages 1006 is divided into rows and the sub-ranges include three rows each for clarity of this disclosure. However, the number of page rows in each sub-range is non-limiting, where the sub-ranges may include any number of page records, including, without limitation, portions of rows. Accordingly, while the illustrated embodiment includes the range of pages 1006 and sub-ranges of pages 1010, 1012, 1014 distributed in a particular organization, any number of pages 1006 and sub-ranges of pages in any configuration may be used that enables operation of the database partial reorganization system 400 as described herein.

In some embodiments, the process 1000 includes unloading 1020 (i.e., copying or scanning) the first sub-range 1010 of pages from the table space 1004, through the reorganization module 440, to temporarily reside within the memory device 406 as shown by an arrow 1022, thereby defining a set of unloaded records 1024. As discussed further herein, the records in the first sub-range 1010 of pages remain in use until the switching activities are concluded. Accordingly, the records within the respective sub-range 1010 of page to be reorganized are copied from their respective portions of the table space 1004 into the memory device 406.

In at least some embodiments, the process 1000 also includes reloading 1030 the unloaded records 1024 into new pages 1032 allocated within a buffer pool 1034 as shown by the arrow 1036. In some embodiments, the buffer pool 1034 is resident within the memory device 406 and in some embodiments it is resident within the table space 1004. Prior to the reloading 1030, the new pages 1032 are mapped to the pages in the first sub-range 1010 of pages. Also, prior to the reloading 1030, the storage space in the table space 1004 necessary to receive the unloaded records 1024 is calculated, including appropriate values for the percentage of free space on each page to remain after the reloading 1030 and the number of free pages to be added. Moreover, in one or more embodiments, prior to the reloading 1030, the records (not shown) within the affected pages, i.e., the first sub-range 1010 of pages, are sorted as needed to properly cluster the records within the affected pages in the first sub-range 1010. Accordingly, any clustering of the respective records is completed prior to reloading 1030 the respective records.

The pages 1032 in the buffer pool 1034 are set as "unavailable" to prevent inadvertent use of the reserved and allocated pages 1032 due to the database storage system 408 not being taken off line while online transaction synchronizations 1042 are applied (as indicated by an arrow 1044) to the first sub-range 101 of pages, i.e., the routine data read, write, and delete activities continue. While not shown in FIG. 10, the records resident within the affected pages 1006 in the table space 1004 are updated in parallel with the unloaded records 1024 to facilitate maintaining synchronization of the data therein until the switching activities (discussed further herein) are completed. The unloaded records 1024 are reloaded 1030 into the allocated pages 1032 within the buffer pool 1034. Furthermore, as described further herein, the affected sub-range 1010 of data pages 1006 within the allocated pages 1032 is defragmented such that a plurality of reorganized pages 1038 and a plurality of substantially free pages 1040 are generated. While the number of reorganized pages 1038 to the plurality of substantially free pages 1040 is shown as approximately equal, the ratio of reorganized pages 1038 to substantially free pages may be any value that enables operation of the database partial reorganization system 400 as described herein. In addition, the ratio of data records to free space within the reorganized pages 1038 is any value that enables operation of the database partial reorganization system 400 as described herein.

In one or more embodiments, keys 1062 associated with the index 1008 are built 1060 to reflect the new locations of the records within the reorganized pages 1038. A map is built 1064 between the old ROWID values 1066 and the new ROWID values 1068. The index keys 1062 are built 1060 for all of the indexes 1008 in the reorganized pages 1038, where the index keys 1062 are now related to the new ROWID values 1068. Accordingly, the defragmentation and reorganization of the unloaded records 1024 that are reloaded 1030 into the allocated pages 1032 to generate the reorganized pages 1038 including generating new index keys 1062 for each of the affected pages 1006 in the affected sub-range 1010.

In at least some embodiments, the process 1000 further includes switching 1070 at the data page level the data pages 1006 in the first sub-range 1010 of pages with the reorganized pages 1038 and substantially free pages 1040. The old records (not shown) in the affected first sub-range 1010 of data pages are locked (thereby ending the online transaction synchronization 1042 thereof) within the table space 1004, and the index 1008 is updated to shift the respective pointers (not shown) to the new locations of the respective records. The reorganized pages 1038 and substantially free pages 1040 in the buffer pool 1034 are written out 1048, i.e., transmitted, to the portion of the table space 1004 to store the first sub-range 1010 of pages to overwrite the existing pages therein. Accordingly, the defragmented and reorganized pages 1038 and substantially free pages 1040 are transmitted to the table space 1004, while the online transactions synchronizations 1042 continue to be applied to the affected records to mitigate potential for incongruent data.

The defragmentation and reorganization of the remaining second sub-range 1012 and the third sub-range 1014, etc., until all of the pages 1006 are processed. Accordingly, referring again to FIGS. 6B-6C, one or more of the recommended partial reorganization methods 624, 634, 644, and 654 are executed 660.

Figure 11:
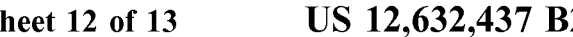
FIG. 11 is a schematic diagram illustrating a process for defragmenting and reorganizing a table space to mitigate space usage issues, in accordance with some embodiments of the present disclosure.

Referring to FIG. 11, a schematic diagram is provided illustrating a process 1100 for defragmenting and reorganizing a table space to mitigate space usage issues. A table space 1104, a range of a plurality of pages 1106, and an index 1108 are shown, where these three artifacts are substantially similar to similarly identified objects in FIG. 10. The range of pages 1106 includes a first sub-range 1110 of pages, a second sub-range 1112 of pages, and a third sub-range 1114 of pages, where all three sub-ranges 1110, 1112, 1114 include some combination of lightly loaded pages, intermediately loaded pages, and heavily loaded page, where substantially free pages are excluded for clarity of the description of the process 1100. While the illustrated embodiment includes the range of pages 1106 and sub-ranges of pages 1110, 1112, 1114 distributed in a particular organization with a particular content of records therein, any number of pages 1106 and sub-ranges of pages in any configuration with any amount of embedded records may be used that enables operation of the database partial reorganization system 400 as described herein.

The affected sub-range 1110 of data pages 1106 is defragmented 1180 such that a plurality of reorganized pages 1138A and a plurality of substantially free pages 1140A are generated in accordance with the space parameters described herein. The ratio of reorganized pages 1038A to the plurality of substantially free pages 1040A as shown is exemplary only, and the ratio of reorganized pages 1138A to substantially free pages 1140A may be any value that enables operation of the database partial reorganization system 400 as described herein. In addition, the ratio of data records to free space within the reorganized pages 1138A is any value that enables operation of the database partial reorganization system 400 as described herein.

Similarly, the affected sub-range 1112 of data pages 1106 is defragmented 1182 such that a plurality of reorganized pages 1138B and a plurality of substantially free pages 1140B are generated in accordance with the space parameters described herein. As shown, the number of reorganized pages 1138B and the number of the substantially free pages 1140B is increased from reorganized pages 1138A and substantially free pages 1140A. In addition, the affected sub-range 1114 of data pages 1106 is defragmented 1184 such that a plurality of reorganized pages 1138C and a plurality of substantially free pages 1140C are generated in accordance with the space parameters described herein. As shown, the number of reorganized pages 1138C and the number of the substantially free pages 1140C is increased from reorganized pages 1138B and substantially free pages 1140B. Accordingly, the defragmentation and reorganization of the data pages 1106 is iterated for each of the designated sub-ranges until all data pages 1106 in the table space 1104 are either reorganized or are substantially free, while substantially maintaining production through the affected table space 1104.

Figure 12:
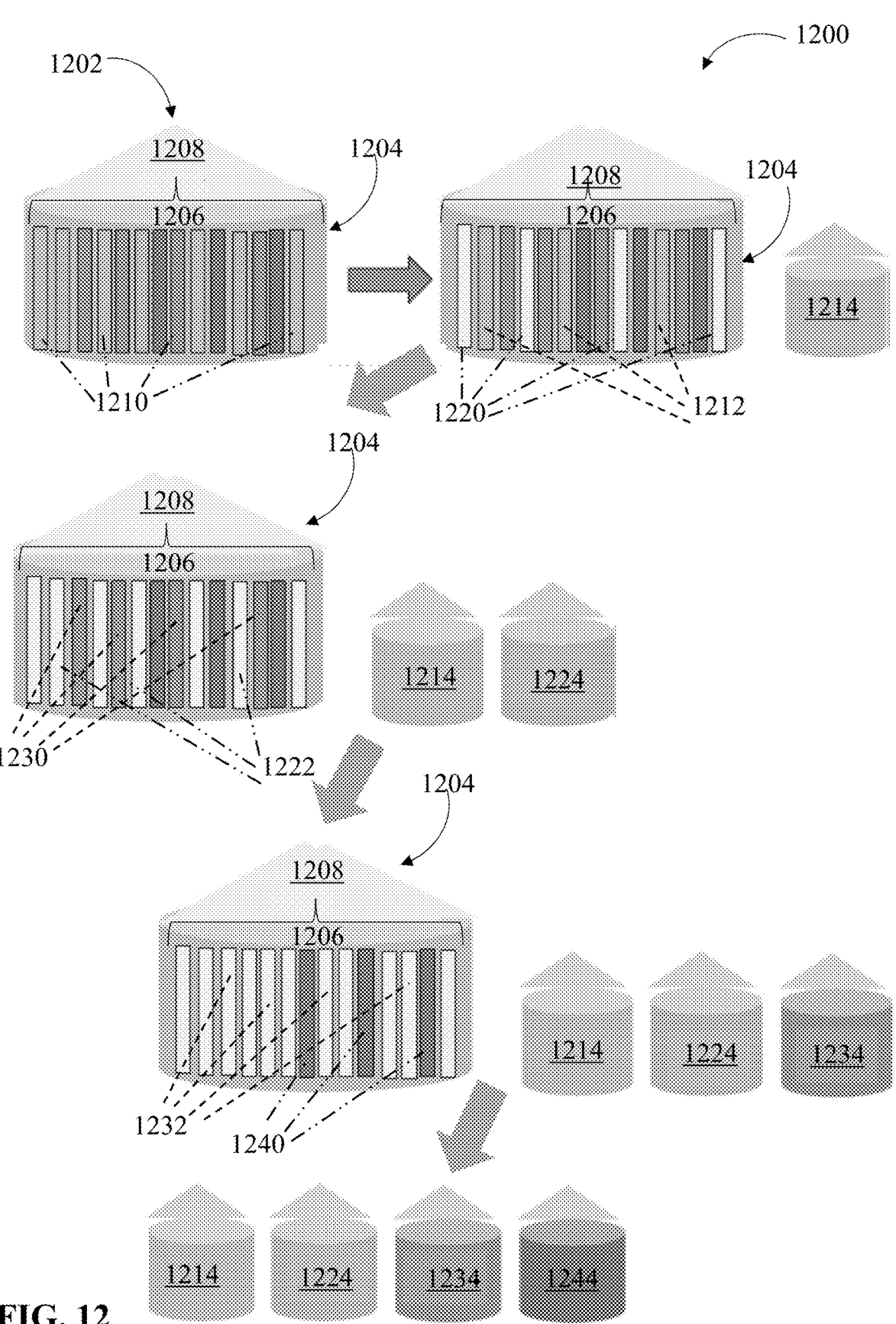
FIG. 12 is a schematic diagram illustrating a process for converting a non-partitioned table space into a partitioned table space, in accordance with some embodiments of the present disclosure.

Referring to FIG. 12, a schematic diagram is provided illustrating a process 1200 for converting a non-partitioned table space into a partitioned table space. In at least some embodiments, it may be more practical to partition data records upon completion of a reorganization as described with respect to FIGS. 7, 8, 9, and 10-11. A database 1202 includes a table space 1204 and an index 1208. In some embodiments, the table space 1204 is populated with a range 1206 of data pages, where 14 rows of data pages are shown in the range 1206, and 14 is a non-limiting number. Each of the rows may be identified as belonging to a designated sub-range, similar to the sub-ranges described with respect to FIGS. 10-11. However, here, the rows of data pages are not necessarily organized into sequential or adjacent rows.

In one embodiment, a first sub-range 1210 is identified, and the associated data is transferred to a first partition 1214, thereby leaving empty portions 1212 of the table space 1204. Similarly, a second sub-range 1220 is identified, and the associated data is transferred to a second partition 1224, thereby leaving empty portions 1222 of the table space 1204. In addition, a third sub-range 1230 is identified, and the associated data is transferred to a third partition 1234, thereby leaving empty portions 1232 of the table space 1204. Moreover, a fourth sub-range 1240 is identified, and the associated data is transferred to a fourth partition 1244, thereby leaving only empty portions of the table space 1204. Accordingly, partitioning a non-partitioned table may be performed through the conversion without taking the associated database system off-line, thereby maintaining production through the affected table space.

The system, computer program product, and method as disclosed herein facilitate overcoming the disadvantages of and limitations of the off-line reorganization of databases. For large databases, the time required for taking the database out of production is significantly reduced since the periodic data reorganization of performance sensitive workloads may be performed only on those portions of the database requiring such reorganization, while the remainder of the database may remain in production. Moreover, the periods of unavailability of those smaller portions of the database that do undergo a reorganization are significantly reduced since the subject portions are not taken offline, and production disruptions are minimized. In addition, due to the significant reduction in disruption to production, the partial reorganizations may be performed more often, thereby further enhancing the performance of the performance sensitive workloads. Furthermore, the methods and systems described herein may enhance overall data management on the finite physical storage space by maintaining a greater number of substantially free data pages and free data space on the pages with data resident thereon. Also, the methods and systems described herein enhance self-management of the respective database systems, including the indexing features.

Therefore, the embodiments disclosed herein provide an improvement to computer technology by providing a mechanism for reorganizing a large database through small, partial reorganizations on portions of the database individually while maintain the database system in production. Such a mechanism mitigates a potential for disruption of access to the database, where round-the-clock production may be required.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:

one or more processing devices and at least one memory device operably coupled to the one or more processing devices, the one or more processing devices are configured to:

collect performance information for one or more performance sensitive workloads associated with one or more portions of a database, wherein at least a portion of the performance information is associated with a classification of performance declines, wherein sources of the collected performance information comprise an execution log comprising one or more of the following in a group consisting of: page I/O operations, overflow ratios, and execution times of workloads, workload information comprising one or more of the following in a group consisting of: data updates and insertion workloads, and database statistics comprising one or more of the following in a group consisting of: cluster ratios, record deletion numbers, record insertion numbers, and record overflow numbers;

analyze indications of cluster ratio issues, hot spots, overflow issues, and space usage issues;

detect a presence of a performance issue based on the analyzed indications;

generate one or more recommended partial reorganization actions based on the detected performance issue, wherein the one or more recommended partial reorganization actions comprise one of the following in a group consisting of: restoring a clustering sequence of affected records in response to detecting a cluster ratio below a first threshold value, spreading out hot data into more of a table space and increasing an amount of free physical storage space available on affected pages in response to detecting a presence of the hot spots, removing overflow records and increasing an amount of free physical storage space available on affected pages in response to detecting an overflow ratio exceeding a second threshold value, and performing a defragmentation in response to detecting page I/O transaction numbers exceeding a third threshold value; and execute, subject to the classification of the performance declines, one or more partial reorganizations from the one or more recommended partial reorganization actions of the one or more database portions comprising maintaining all online transactions, without disruption, during all portions of the one or more partial reorganizations comprising:

copying a first plurality of records to define a second set of records; and updating, in parallel, the first plurality of records and the second plurality of records, thereby maintaining synchronization of the data therein.

2. The system of claim 1, wherein the one or more processing devices are further configured to:

analyze the collected performance information comprising one or more of:

determine for each of the one or more performance sensitive workloads, indications of performance declines thereof;

determine, subject to the determined performance declines, at least one of the one or more database portions affected by the determined performance declines; and classify, subject to the database portions determination, the determined performance declines; and determine one or more characteristics of the one or more database portions subject to the partial reorganization.

3. The system of claim 2, wherein the one or more processing devices are further configured to:

determine that one or more clustering ratio measurements within the collected performance information is one of approaching and passing through a clustering ratio threshold value;

determine that one or more hot spot measurements within the collected performance information is one of approaching and passing through a hot spot threshold value;

determine that one or more overflow ratio measurements within the collected performance information is one of approaching and exceeding an overflow ratio threshold value; and determine that one or more space usage measurements within the collected performance information is one of approaching and exceeding a space usage threshold value.

4. The system of claim 3, wherein the one or more processing devices are further configured to:

determine one or more of affected record ranges; and determine one or more of affected page ranges.

5. The system of claim 1, wherein the one or more processing devices are further configured to:

conduct one or more transactions with at least a portion of affected data during at least a portion of the one or more partial reorganizations comprising:

identifying a plurality of affected original records, thereby defining the first plurality of records;

making a copy of each affected original record of the one or more affected original records, thereby defining the second plurality of records;

executing the one or more transactions on the first plurality of records and the second plurality of records in parallel, wherein synchronization of data therein is maintained;

reorganizing the second plurality of records;

ending, subject to completing the reorganizing of the second plurality of records, the transaction activities on the first plurality of records; and removing the second plurality of records from service.

6. The system of claim 1, wherein the one or more processing devices are further configured to:

defragment and reorganize a table space with the table space in production.

7. A computer program product, comprising:

one or more non-transitory computer readable storage media; and program instructions collectively stored on the one or more computer storage media, the program instructions comprising:

program instructions to collect performance information for one or more performance sensitive workloads associated with one or more portions of a database, wherein at least a portion of the performance information is associated with a classification of performance declines, wherein sources of the collected performance information comprise an execution log comprising one or more of the following in a group consisting of: page I/O operations, overflow ratios, and execution times of workloads, workload information comprising one or more of the following in a group consisting of: data updates and insertion workloads, and database statistics comprising one or more of the following in a group consisting of: cluster ratios, record deletion numbers, record insertion numbers, and record overflow numbers;

program instructions to analyze indications of cluster ratio issues, hot spots, overflow issues, and space usage issues;

program instructions to detect a presence of a performance issue based on the analyzed indications;

program instructions to generate one or more recommended partial reorganization actions based on the detected performance issue, wherein the one or more recommended partial reorganization actions comprise one of the following in a group consisting of: restoring a clustering sequence of affected records in response to detecting a cluster ratio below a first threshold value, spreading out hot data into more of a table space and increasing an amount of free physical storage space available on affected pages in response to detecting a presence of the hot spots, removing overflow records and increasing an amount of free physical storage space available on affected pages in response to detecting an overflow ratio exceeding a second threshold value, and performing a defragmentation in response to detecting page I/O transaction numbers exceeding a third threshold value; and program instructions to execute, subject to the classification of the performance declines, one or more partial reorganizations from the one or more recommended partial reorganization actions of the one or more database portions comprising maintaining all online transactions, without disruption, during all portions of the one or more partial reorganizations comprising:

program instructions to copy a first plurality of records to define a second set of records; and program instructions to update, in parallel, the first plurality of records and the second plurality of records, thereby maintaining synchronization of the data therein.

8. The computer program product of claim 7, further comprising:

program instructions to analyze the collected performance information comprising one or more of:

program instructions to determine for each of the one or more performance sensitive workloads, indications of performance declines thereof;

program instructions to determine, subject to the determined performance declines, at least one of the one or more database portions affected by the determined performance declines; and program instructions to classify, subject to the database portions determination, the determined performance declines; and program instructions to determine one or more characteristics of the one or more database portions subject to the partial reorganization.

9. The computer program product of claim 8, further comprising:

program instructions to determine that one or more clustering ratio measurements within the collected performance information is one of approaching and passing through a clustering ratio threshold value;

program instructions to determine that one or more hot spot measurements within the collected performance information is one of approaching and passing through a hot spot threshold value;

program instructions to determine that one or more overflow ratio measurements within the collected performance information is one of approaching and exceeding an overflow ratio threshold value; and program instructions to determine that one or more space usage measurements within the collected performance information is one of approaching and exceeding a space usage threshold value.

10. The computer program product of claim 7, further comprising:

program instructions to conduct one or more transactions with at least a portion of affected data during at least a portion of the one or more partial reorganizations comprising:

program instructions to identify a plurality of affected original records, thereby defining the first plurality of records;

program instructions to make a copy of each affected original record of the one or more affected original records, thereby defining the second plurality of records;

program instructions to execute the one or more transactions on the first plurality of records and the second plurality of records in parallel, wherein synchronization of data therein is maintained;

program instructions to reorganize the second plurality of records;

program instructions to end, subject to completing the reorganizing of the second plurality of records, the transaction activities on the first plurality of records; and program instructions to remove the second plurality of records from service.

11. The computer program product of claim 7, further comprising:

program instructions to defragment and reorganize a table space with the table space in production.

12. A computer-implemented method comprising:

collecting performance information for one or more performance sensitive workloads associated with one or more portions of a database, wherein at least a portion of the performance information is associated with a classification of performance declines, wherein sources of the collected performance information comprise an execution log comprising one or more of the following in a group consisting of: page I/O operations, overflow ratios, and execution times of workloads, workload information comprising one or more of the following in a group consisting of: data updates and insertion workloads, and database statistics comprising one or more of the following in a group consisting of: cluster ratios, record deletion numbers, record insertion numbers, and record overflow numbers;

analyzing indications of cluster ratio issues, hot spots, overflow issues, and space usage issues;

detecting a presence of a performance issue based on the analyzed indications;

generating one or more recommended partial reorganization actions based on the detected performance issue, wherein the one or more recommended partial reorganization actions comprise one of the following in a group consisting of: restoring a clustering sequence of affected records in response to detecting a cluster ratio below a first threshold value, spreading out hot data into more of a table space and increasing an amount of free physical storage space available on affected pages in response to detecting a presence of the hot spots, removing overflow records and increasing an amount of free physical storage space available on affected pages in response to detecting an overflow ratio exceeding a second threshold value, and performing a defragmentation in response to detecting page I/O transaction numbers exceeding a third threshold value; and executing, subject to the classification of the performance declines, one or more partial reorganizations from the one or more recommended partial reorganization actions of the one or more database portions maintaining all online transactions, without disruption, during all portions of the one or more partial reorganizations comprising:

copying a first plurality of records to define a second set of records; and updating, in parallel, the first plurality of records and the second plurality of records, thereby maintaining synchronization of the data therein.

13. The method of claim 12, wherein classifying the determined performance declines comprises:

analyzing the collected performance information comprising one or more of:

determining for each of the one or more performance sensitive workloads, indications of performance declines thereof;

determining, subject to the determined performance declines, at least one of the one or more database portions affected by the determined performance declines; and classifying, subject to the database portions determination, the determined performance declines; and determining one or more characteristics of the one or more database portions subject to the partial reorganization.

14. The method of claim 13, wherein determining the one or more characteristics comprises one or more of:

determining that one or more clustering ratio measurements within the collected performance information is one of approaching and passing through a clustering ratio threshold value;

determining that one or more hot spot measurements within the collected performance information is one of approaching and passing through a hot spot threshold value;

determining that one or more overflow ratio measurements within the collected performance information is one of approaching and exceeding an overflow ratio threshold value; and determining that one or more space usage measurements within the collected performance information is one of approaching and exceeding a space usage threshold value.

15. The method of claim 14, wherein determining the one or more characteristics comprises one or more of:

determining one or more of affected record ranges; and determining one or more of affected page ranges.

16. The method of claim 12, wherein maintaining synchronization of the data comprises:

conducting one or more transactions with at least a portion of affected data during at least a portion of the one or more partial reorganizations comprising:

identifying a plurality of affected original records, thereby defining the first plurality of records;

making a copy of each affected original record of the one or more affected original records, thereby defining the second plurality of records;

executing the one or more transactions on the first plurality of records and the second plurality of records in parallel, wherein synchronization of data therein is maintained;

reorganizing the second plurality of records;

ending, subject to completing the reorganizing of the second plurality of records, the transaction activities on the first plurality of records; and removing the second plurality of records from service.

17. The method of claim 12, wherein executing the one or more partial reorganizations of the one or more database portions comprises:

defragmenting and reorganizing a table space with the table space in production.

\* \* \* \* \*